(12) United States Patent
Ogawara

(10) Patent No.: US 8,331,694 B2
(45) Date of Patent: Dec. 11, 2012

(54) PROGRAM PATTERN ANALYZING APPARATUS, PATTERN APPEARANCE STATUS INFORMATION PRODUCTION METHOD, PATTERN INFORMATION GENERATING APPARATUS, AND PROGRAM

(75) Inventor: Takashi Ogawara, Tokyo (JP)

(73) Assignee: System's Co., Ltd., Tokyo (JP)

( * ) Notice: Subject to any disclaimer, the term of this patent is extended or adjusted under 35 U.S.C. 154(b) by 1050 days.

(21) Appl. No.: 12/227,773

(22) PCT Filed: Apr. 18, 2008

(86) PCT No.: PCT/JP2008/057571
§ 371 (c)(1),
(2), (4) Date: Nov. 26, 2008

(87) PCT Pub. No.: WO2008/139831
PCT Pub. Date: Nov. 20, 2008

(65) Prior Publication Data
US 2009/0136123 A1 May 28, 2009

(30) Foreign Application Priority Data

May 8, 2007 (JP) ................................. 2007-123024
Nov. 19, 2007 (JP) ................................. 2007-299103

(51) Int. Cl.
G06K 9/68 (2006.01)
G06F 9/45 (2006.01)
(52) U.S. Cl. ....................................... 382/218; 382/229
(58) Field of Classification Search .................. 382/181, 382/229, 217, 218; 717/136, 137; 704/2
See application file for complete search history.

(56) References Cited

U.S. PATENT DOCUMENTS

2004/0103405 A1* 5/2004 Vargas ........................... 717/137
2005/0050525 A1* 3/2005 Chittar et al. .................. 717/136
(Continued)

FOREIGN PATENT DOCUMENTS

JP 03-252819 A 11/1991
(Continued)

OTHER PUBLICATIONS

Office Action (Japanese Patent Application No. 2008-107558) mailed on Nov. 21, 2008 (Japan).
(Continued)

*Primary Examiner* — Jon Chang
(74) *Attorney, Agent, or Firm* — Rader, Fishman & Grauer PLLC

(57) ABSTRACT

Conventionally, there is the problem that a source program that is to be converted cannot be properly analyzed and the conversion ratio cannot be improved. The present invention provides a program pattern analyzing apparatus, comprising: a pattern information storage portion 201 in which at least one piece of first command pattern information of a first source program can be stored; a first source program accepting portion 202 that accepts the first source program; a comparing portion 203 that fetches at least one piece of conversion unit information from the first source program and compares each piece of the fetched conversion unit information with the first command pattern information stored in the pattern information storage portion 201; and a pattern accumulating portion 204 that accumulates comparison command pattern information that is information indicating a command pattern corresponding to the conversion unit information judged by the comparing portion 203 to match none of the first command pattern information, as the first command pattern information, in the pattern information storage portion 201.

10 Claims, 24 Drawing Sheets

FOREIGN PATENT DOCUMENTS

| | | |
|---|---|---|
| JP | 06-110701 A | 4/1994 |
| JP | 10-293685 A | 11/1998 |
| JP | 2002-041286 A | 2/2002 |
| JP | 2004-185508 A | 7/2004 |
| JP | 2006-079484 A | 3/2006 |

OTHER PUBLICATIONS

Laid-Open Technical Review (Publication No. 93-7821), Japan Institute of Invention and Innovation, issued on Mar. 1, 1993 (Japan).

International Search Report PCT/ISA/210, May 13, 2008 (2 pages).

* cited by examiner

FIG.3

| ID | first command pattern |
|---|---|
| 1 | IDENTIFICATION DIVISION |
| 2 | CONFIGURATION SECTION |
| 3 | PROGRAM-ID *VARIABLE01* |
| 4 | INPUT-OUTPUT SECTION |
| 5 | FILE-CONTROL |
| 6 | OBJECT-COMPUTER *VARIABLE01* |
| 7 | SELECT *VARIABLE01* ASSIGN TO *VARIABLE02* |
| 8 | SELECT *VARIABLE01* ASSIGN TO *VARIABLE02* ORGANIZATION SEQUENTIAL ACCESS…FILE STATUS *VARIABLE03* *VARIABLE04* |
| 9 | SELECT *VARIABLE01* ASSIGN TO *VARIABLE02* ORGANIZATION INDEXED ACCESS MODE…RANDOM RECORD KEY *VARIABLE03* FILE STATUS IS *VARIABLE04* |
| 10 | SOURCE-COMPUTER *VARIABLE01* |
| 11 | DATA DIVISION |
| 12 | FILE SECTION |
| 13 | WORKING-STORAGE SECTION |
| 14 | NUMBER *VARIABLE01* |
| 15 | NUMBER *VARIABLE01* OCCURS *NUMERIC CHARACTER01* DEPENDING ON *VARIABLE02* |
| 16 | NUMBER *VARIABLE01* PIC X(*NUMERIC CHARACTER01*) |
| … | … |

FIG.4

```
000010****************************************
000020*  customer name    : X company                    *
000030*  program name     : sales ranking list creation  *
000040*  program ID       : P S D 7 1 2                  *
000050*  originator name  : XXXXXX                       *
000060*  creation date    : 00. 00. 00                   *
000070*  revision date    : 00. 00. 00                   *
000080****************************************
000090 IDENTIFICATION         DIVISION
000100 PROGRAM-ID            PSD712
000110*
000120 ENVIRONMENT            DIVISION
000130 CONFIGURATION          SECTION
000140 SOURCE-COMPUTER        HOST
000150 OBJECT-COMPUTER        HOST
000160 INPUT-OUTPUT           SECTION
000170 FILE-CONTROL
000180****************************************
000190*    regular customer master
000200****************************************
000210 SELECT FIL30 ASSIGN  TO   K3-DK00-FIL30
000220                    ORGANIZATION SEQUENTIAL
000230                    ACCESS       SEQUENTIAL
000240                    SHARE        NO
000250                    FILE STATUS  STATUS-1 STATUS-2
000260****************************************
000270*    control file
000280****************************************
000290 SELECT FIL00 ASSIGN  TO   C0-DK00-FIL00
000300                    ORGANIZATION RELATIVE
000310                    ACCESS       DYNAMIC
000320                    RELATIVE     C0-KEY
000330                    SHARE        I-O
000340                    FILE STATUS  STATUS-1 STATUS-2
         ⋮                      ⋮
```

FIG.5

| source ID | row number | source code | first command pattern |
|---|---|---|---|
| PSD712 | 000090 | IDENTIFICATION DIVISION | IDENTIFICATION DIVISION |

FIG.6

| source ID | row number | source code | first command pattern |
|---|---|---|---|
| PSD712 | 000090 | IDENTIFICATION DIVISION | IDENTIFICATION DIVISION |
| PSD712 | 000100 | PROGRAM-ID PSD712 | PROGRAM-ID *VARIABLE01* |
| PSD712 | 000120 | ENVIRONMENT DIVISION | else |
| PSD712 | 000130 | CONFIGURATION SECTION | CONFIGURATION SECTION |
| PSD712 | 000140 | SOURCE-COMPUTER HOST | SOURCE-COMPUTER *VARIABLE01* |
| PSD712 | 000150 | OBJECT-COMPUTER HOST | OBJECT-COMPUTER *VARIABLE01* |
| PSD712 | 000160 | INPUT-OUTPUT SECTION | INPUT-OUTPUT SECTION |
| ⋮ | ⋮ | ⋮ | ⋮ |

FIG.7

| source ID | pattern ID | first command pattern | number of times of appearance |
|---|---|---|---|
| PSD712 | 001 | IDENTIFICATION DIVISION | 1 |
| PSD712 | 002 | CONFIGURATION SECTION | 1 |
| PSD712 | 003 | PROGRAM-ID *VARIABLE01* | 1 |
| PSD712 | 004 | INPUT-OUTPUT SECTION | 1 |
| PSD712 | 005 | FILE-CONTROL | 1 |
| PSD712 | 006 | OBJECT-COMPUTER *VARIABLE01* | 1 |
| PSD712 | 007 | SELECT *VARIABLE01* ASSIGN TO *VARIABLE02* | 87 |
| PSD712 | 008 | SELECT *VARIABLE01* ASSIGN TO *VARIABLE02* ORGANIZATION SEQUENTIAL ACCESS⋯FILE STATUS *VARIABLE03 VARIABLE04* | 5 |
| PSD712 | 009 | SELECT *VARIABLE01* ASSIGN TO *VARIABLE02* ORGANIZATION INDEXED ACCESS MODE⋯RANDOM RECORD KEY *VARIABLE03* FILE STATUS IS *VARIABLE04* | 24 |
| PSD712 | 010 | SOURCE-COMPUTER *VARIABLE01* | 2 |
| PSD712 | 011 | DATA DIVISION | 8 |
| PSD712 | 012 | FILE SECTION | 14 |
| PSD712 | 013 | WORKING-STORAGE SECTION | 1 |
| PSD712 | 014 | *NUMBER VARIABLE01* | 26 |
| PSD712 | 015 | *NUMBER VARIABLE01* OCCURS *NUMERIC CHARACTER01* DEPENDING ON *VARIABLE02* | 5 |
| PSD712 | 016 | *NUMBER VARIABLE01* PIC X (*NUMERIC CHARACTER01*) | 1 |
| ⋮ | ⋮ | ⋮ | ⋮ |

FIG.11

| ID | first command pattern |
|---|---|
| P800001 | PROGRAM-ID   *VARIABLE* |
| P800002 | AUTHOR   *VARIABLE* |
| P800003 | SOURCE-COMPUTER   *VARIABLE* |
| P800004 | OBJECT-COMPUTER   *VARIABLE* |
| ⋮ | ⋮ |

FIG.12

```
000200      IDENTIFICATION  DIVISION.
000300      PROGRAM-ID  PGID001.
000400      COPY  AAA.
000500      01  AAA  PIC  9.
000600      01  BBB  PIC  X.
000700      01  CCC  PIC  9.
000800      01  DDD  PIC  9.
    ⋮              ⋮
001300      MOVE  AAA  TO  BBB.
001400      CALL  "AAA"  USING  AAA
001500                     IOX-PCB
001600                     100.
    ⋮              ⋮
```

FIG.13

| ID | specified information |
|---|---|
| C5001 | IF |
| C5002 | ELSE |
| C5003 | COMPUTE |
| C5004 | CALL |
| C5005 | SET |
| C5006 | MOVE |
| ⋮ | ⋮ |

FIG.14

| | |
|---|---|
| 000200 | IDENTIFICATION DIVISION |
| 000300 | PROGRAM-ID PGID001. |
| 000400 | COPY AAA. |
| 000500 | 01 AAA PIC 9. |
| 000600 | 01 BBB PIC X. |
| 000700 | 01 CCC PIC 9. |
| 000800 | 01 DDD PIC 9. |
| ⋮ | ⋮ |
| 001300 | MOVE AAA TO BBB. |
| 001400 | CALL "AAA" USING AAA ~~~~ 1401 |
| 001500 | IOX-PCB |
| 001600 | 100. |
| ⋮ | ⋮ |

FIG.15

| ID | user specified word |
|---|---|
| U0001 | IOX-PCB |
| U0002 | 010 |
| U0003 | "JSATTC" |
| U0004 | PROGRAM-ID |
| U0005 | AUTHOUR |
| U0006 | SOURCE-COMPUTER |
| ⋮ | ⋮ |

FIG.16

| ID | conversion condition | conversion word |
|---|---|---|
| R001 | PROGRAM-ID,after | PROGRAM NAME |
| R002 | FD,after | FILE NAME |
| R003 | 01,after | GROUP ITEM |
| R004 | "literal character" | "CHARACTER ITEM" |
| R005 | numeric character | NUMBER |
| R006 | NUMBER,after | VARIABLE |
| R007 | AAA | NUMERIC CHARACTER ITEM |
| ⋮ | ⋮ | ⋮ |

FIG.17

|        |                          | 1701 |
|--------|--------------------------|---------|
| 000200 | IDENTIFICATION DIVISION. | P800055 |
| 000300 | PROGRAM-ID PGID001.      | P800001 |
| 000400 | COPY AAA.                | P800123 |
| 000500 | 01 AAA PIC 9.            | P800088 |
| 000600 | 01 BBB PIC X.            | P800028 |
| 000700 | 01 CCC PIC 9.            | P800065 |
| 000800 | 01 DDD PIC 9.            | P800014 |
| ⋮      | ⋮                        | ⋮       |
| 001300 | MOVE AAA TO BBB.         | P800015 |
| 001400 | CALL "AAA" USING AAA     | P800100 |
| 001500 |     IOX-PCB | ⋮ |
| 001600 |     100.    |   |
| ⋮      | ⋮                        |         |

FIG.18

| source ID | pattern ID | row |
|---|---|---|
| PGID001 | P800055 | 000200 |
| PGID001 | P800001 | 000300 |
| PGID001 | P800123 | 000400 |
| ⋮ | ⋮ | ⋮ |
| PGID001 | P800015 | 001300 |
| PGID001 | P800100 | 001400 |
| ⋮ | ⋮ | ⋮ |

FIG.19

| ID | first command pattern |
|---|---|
| P800001 | PROGRAM-ID　　　　 VARIABLE |
| P800002 | AUTHOR　　　　　　 VARIABLE |
| P800003 | SOURCE-COMPUTER　 VARIABLE |
| P800004 | OBJECT-COMPUTER　 VARIABLE |
| ⋮ | ⋮ |
| P800100 | CALL　"CHARACTER CONSTANT" USING NUMERIC CHARACTER ITEM　10X-PCB　NUMBER |
| ⋮ | ⋮ |

FIG.20

| row | conversion unit information | first command pattern information |
|---|---|---|
| 000200 | IDENTIFICATION DIVISION | IDENTIFICATION DIVISION |
| 000300 | PROGRAM-ID PGID001 | PROGRAM-ID *VARIABLE* |
| 000400 | COPY AAA | COPY *NUMERIC CHARACTER ITEM* |
| ⋮ | ⋮ | ⋮ |
| 001300 | MOVE AAA TO BBB | MOVE *NUMERIC CHARACTER ITEM* TO *ALPHANUMERIC CHARACTER ITEM* |
| 001400 | CALL "AAA" USING AAA IOX-PCB 100 | ELSE |
| ⋮ | ⋮ | ⋮ |

US 8,331,694 B2

PROGRAM PATTERN ANALYZING APPARATUS, PATTERN APPEARANCE STATUS INFORMATION PRODUCTION METHOD, PATTERN INFORMATION GENERATING APPARATUS, AND PROGRAM

TECHNICAL FIELD

The present invention relates to program pattern analyzing apparatuses and the like used for analyzing a source program that is to be converted.

BACKGROUND ART

Conventionally, as a technique for automatically converting a source program, there is a technique in which development work is improved by automatically detecting differences between descriptions resulting from differences between compilers, and automatically correcting or listing the differences (see Patent Document 1, for example). According to this technique, a source program described in C language is parsed, a database and an intermediate file are created for each token, a target character string on the database is deleted or changed, information of the database and the intermediate file is generated in a C language file, and thus an object program is generated.
[Patent Document 1] JP 2002-41286A (p. 1, FIG. 1 etc.)

DISCLOSURE OF INVENTION

Problems to be Solved by the Invention

In a conventional technique for automatically converting a source program as described above, the conversion ratio of a source program is not always high, languages that can be handled in automatic conversion are limited, and thus the versatility is not high. Thus, for each source program that is to be converted, it is necessary to judge how to properly perform conversion, for example, whether to use manual operation or an automatic conversion tool, what kind of automatic conversion tool is suitable for use, or which command pattern to support by an automatic conversion tool newly created as an automatic conversion tool for conversion.

However, conventionally, there has been the problem that analysis necessary for converting a source program cannot be properly performed. For example, in a case where the language of a first source program is converted into the language of a second source program, it is difficult to accurately and promptly analyze which command pattern, among those recognized as command patterns that need to be converted, is used in the first source program that is actually to be converted, what kind of and how many command patterns exist as those not recognized as command patterns that need to be converted, and the like. Thus, in converting a source program, for example, what kind of conversion to perform, how many steps are needed, or what kind of automatic conversion tool and the like to use cannot be properly determined. As a result, a source program cannot be efficiently converted.

Furthermore, a unit or the like has not been provided for properly analyzing a source program and increasing the conversion ratio of the source program using an analysis result.

Means for Solving the Problems

The present invention is directed to a program pattern analyzing apparatus, comprising: a pattern information storage portion in which at least one piece of first command pattern information, which is information indicating a command pattern of a first source program, can be stored; a first source program accepting portion that accepts the first source program; a comparing portion that fetches at least one piece of conversion unit information, which is information of a conversion unit functioning as a unit in converting the first source program, from the first source program, and compares each piece of the fetched conversion unit information with the first command pattern information stored in the pattern information storage portion; and a pattern accumulating portion that accumulates comparison command pattern information that is information indicating a command pattern corresponding to the conversion unit information judged by the comparing portion to match none of the first command pattern information, as the first command pattern information, in the pattern information storage portion.

With this configuration, the first command pattern information necessary for converting the first source program is added. As a result, this added first command pattern information is used to convert the first source program, and thus the conversion ratio of the first source program can be improved. Furthermore, the first command pattern information can be optimized according to the first source program.

Furthermore, in the above-described program pattern analyzing apparatus, a configuration can be adopted in which the comparing portion fetches at least one piece of conversion unit information that is information determined according to a rule specified in advance, from the first source program, and compares each piece of the fetched conversion unit information with the first command pattern information stored in the pattern information storage portion.

With this configuration, the first source program and the first command pattern information can be properly compared.

Furthermore, in the above-described program pattern analyzing apparatus, a configuration can be adopted in which the program pattern analyzing apparatus further comprises a specified information storage portion in which at least one piece of specified information, which is information specified in advance, is stored, and the comparing portion fetches at least one piece of conversion unit information, which is information in a range from the appearance of one piece of the specified information stored in the specified information storage portion to the next appearance of one piece of the specified information, from the first source program, and compares each piece of the fetched conversion unit information with the first command pattern information stored in the pattern information storage portion.

With this configuration, the first source program and the first command pattern information can be properly compared.

Furthermore, in the above-described program pattern analyzing apparatus, a configuration can be adopted in which the specified information contains a command word used in the first source program.

With this configuration, the first source program and the first command pattern information can be properly compared.

Furthermore, in the above-described program pattern analyzing apparatus, a configuration can be adopted in which if the comparing portion judges that the conversion unit information matches none of the first command pattern information, the pattern accumulating portion changes the conversion unit information into the comparison command pattern information corresponding to the conversion unit information, and accumulates the comparison command pattern information obtained by the change, as the first command pattern information, in the pattern information storage portion.

With this configuration, the first command pattern information necessary for converting the first source program is added. As a result, the conversion ratio of the first source program can be improved.

Furthermore, in the above-described program pattern analyzing apparatus, a configuration can be adopted in which the comparing portion changes the conversion unit information into the comparison command pattern information corresponding to the conversion unit information, and compares the comparison command pattern information with the first command pattern information, and if the comparing portion judges that the comparison command pattern information matches none of the first command pattern information, the pattern accumulating portion accumulates the comparison command pattern information obtained by the change performed by the comparing portion, as the first command pattern information, in the pattern information storage portion.

With this configuration, the first command pattern information necessary for converting the first source program is added. As a result, the conversion ratio of the first source program can be improved. Furthermore, the conversion unit information is changed into the comparison command pattern information, and the comparison command pattern information is compared with the first command pattern information. Accordingly, the comparison with the first command pattern information can be performed also in terms of, for example, the attribute or the data type of non-reserved words such as variables, and thus the comparison can be more precisely performed. As a result, the first command pattern information indicating more detailed conversion conditions can be added, and thus the conversion can be more precisely performed.

Furthermore, in the above-described program pattern analyzing apparatus, a configuration can be adopted in which the program pattern analyzing apparatus further comprises: a user specified word storage portion in which a user specified word, which is a character string specified by a user, can be stored; and a conversion word storage portion in which a conversion word associated with a conversion condition of a character string can be stored, and the comparing portion comprises: an acquiring unit that fetches the conversion unit information, which is information of a conversion unit functioning as a unit in converting the first source program, from the first source program; a command pattern constructing unit that constructs the comparison command pattern information, by converting a character string that is not the user specified word stored in the user specified word storage portion and that matches the conversion condition associated with the conversion word stored in the conversion word storage portion, in the conversion unit information, into the conversion word associated with the conversion condition; and a pattern comparing unit that compares the comparison command pattern information with the first command pattern information.

With this configuration, the first command pattern information necessary for converting the first source program is added, and thus the conversion ratio of the first source program can be improved. Furthermore, the conversion unit information is changed into the comparison command pattern information, and the comparison command pattern information is compared with the first command pattern information. Thus, the comparison can be more precisely performed. Accordingly, the first command pattern information indicating more detailed conversion conditions can be added, and thus the conversion can be more precisely performed.

Furthermore, in the above-described program pattern analyzing apparatus, a configuration can be adopted in which the conversion condition is a combination of a clue character string, which is information specifying a character string that is to be retrieved, and information indicating the position of a character string that is to be converted, relative to the clue character string, and the command pattern constructing unit constructs the comparison command pattern information, by retrieving a character string that matches the clue character string, in the conversion unit information, and converting a character string whose position relative to the character string that matches the clue character string is indicated by the information indicating the position of a character string that is to be converted, into the conversion word associated with the conversion condition containing the clue character string.

With this configuration, in converting a character string in the conversion unit information into the conversion word, a character string that is to be converted can be specified in various conditions, and thus the degree of freedom in converting the conversion unit information into the comparison command pattern information can be increased.

Furthermore, in the above-described program pattern analyzing apparatus, a configuration can be adopted in which the program pattern analyzing apparatus further comprises an association pattern accumulating portion that accumulates information establishing association with the first command pattern information that matches the conversion unit information, at a position corresponding to the position where the conversion unit information is located in the first source program.

With this configuration, in actually converting a program, how to perform conversion can be determined only by looking at the first source program associated with the first command pattern information, and thus convenience can be increased.

Furthermore, in the above-described program pattern analyzing apparatus, a configuration can be adopted in which the program pattern analyzing apparatus further comprises a program-based association pattern accumulating portion that accumulates information associating the first command pattern information that matches the conversion unit information of the first source program, and the first source program.

With this configuration, based on the information indicating the pattern appearance status, the first command pattern that appears in the first source program can be judged and confirmed, and the frequency at which the first command pattern appears can be checked. Accordingly, in converting a first source program, for example, what kind of conversion to perform and the like can be judged, and the first source program that is to be converted can be properly analyzed. Thus, the first source program can be efficiently converted.

Moreover, the present invention is directed to a program pattern analyzing apparatus, comprising: a pattern information storage portion in which at least one piece of first command pattern information, which is information indicating a command pattern of a first source program, can be stored; a first source program accepting portion that accepts the first source program; a comparing portion that fetches at least one piece of conversion unit information, which is information of a conversion unit functioning as a unit in converting the first source program, from the first source program, and compares each piece of the fetched conversion unit information with the first command pattern information stored in the pattern information storage portion; and a pattern appearance status accumulating portion that accumulates the conversion unit information judged by the comparing portion to match any one piece of the first command pattern information and the first command pattern information judged to match the conversion unit information, in association with each other, and accumulates the conversion unit information judged by the comparing portion to match none of the first command pattern information and information indicating that there is no match, in association with each other.

With this configuration, what kind of first command pattern appears in which row of the first source program can be judged and confirmed. Accordingly, in converting a first source program, for example, what kind of conversion to perform and the like can be judged, and the first source program that is to be converted can be properly analyzed. Thus, the first source program can be efficiently converted. Furthermore, based on the information indicating that there is no matching first command pattern, an execution unit that has no matching first command pattern can be recognized. Accordingly, it is possible to determine what kind of patterns exist in the first source program as command patterns other than the first command patterns stored in the pattern information storage portion. Thus, for example, command patterns that seem to be preferably registered newly as the first command pattern information can be extracted and added to the first command patterns. Accordingly, the first command pattern information stored in the pattern information storage portion can be optimized according to the first source program.

Effect of the Invention

With the program pattern analyzing apparatus and the like according to the present invention, the source program that is to be converted can be properly analyzed.

Furthermore, with the program pattern analyzing apparatus and the like according to the present invention, the conversion ratio of the source program can be improved using a result obtained by analyzing the source program that is to be converted.

BRIEF DESCRIPTION OF THE DRAWINGS

FIG. 3 is a diagram showing a command pattern information management table in this embodiment.

FIG. 4 is a diagram showing an example of a source program in this embodiment.

FIG. 5 is a diagram showing a pattern appearance status management table in this embodiment.

FIG. 6 is a diagram showing the pattern appearance status management table in this embodiment.

FIG. 7 is a diagram showing a counting result management table in this embodiment.

FIG. 11 is a diagram showing an example of a command pattern information management table in this embodiment.

FIG. 12 is a diagram showing an example of a first source program in this embodiment.

FIG. 13 is a diagram showing an example of a specified information management table in this embodiment.

FIG. 14 is a diagram for illustrating conversion unit information in this embodiment.

FIG. 15 is a diagram showing an example of a user specified word management table in this embodiment.

FIG. 16 is a diagram showing an example of a conversion word management table in this embodiment.

FIG. 17 is a diagram showing an example of a first source program in which corresponding patterns are accumulated in this embodiment.

FIG. 18 is a diagram showing an example of a program-based association pattern information in this embodiment.

FIG. 19 is a diagram showing a display example of a command pattern information management table in this embodiment.

FIG. 20 is a diagram showing a display example of pattern appearance status information in this embodiment.

BEST MODE FOR CARRYING OUT THE INVENTION

Figure 1:
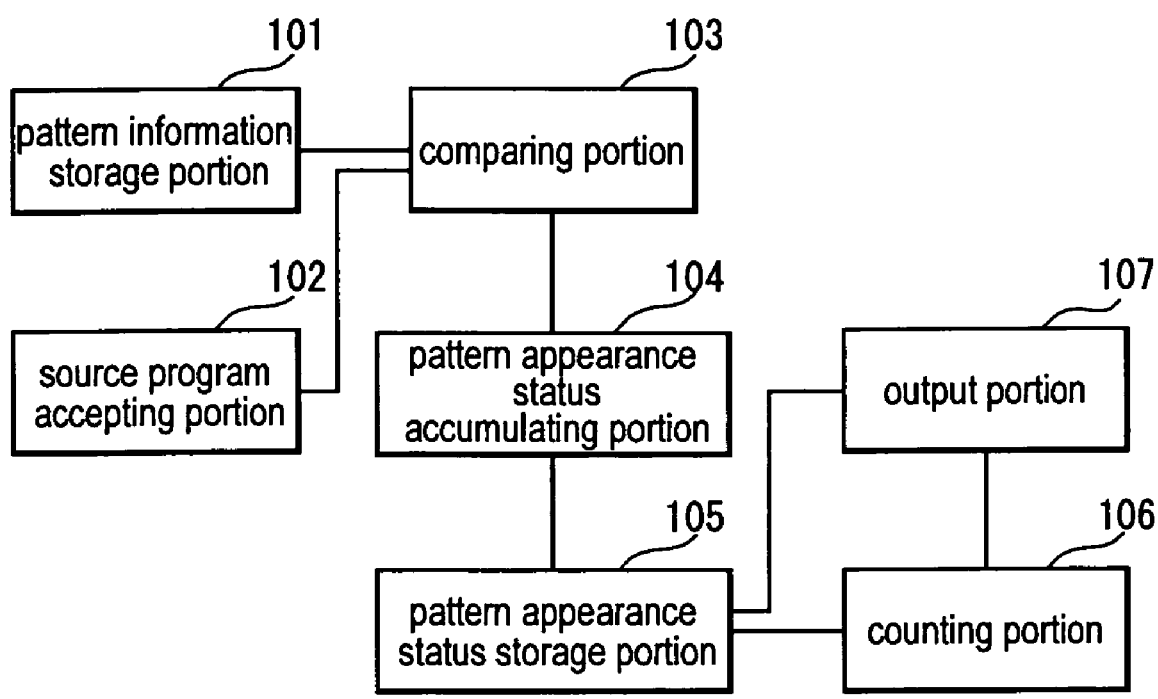
FIG. 1 is a block diagram of a program pattern analyzing apparatus in Embodiment 1.

Hereinafter, embodiments of a program pattern analyzing apparatus and the like will be described with reference to the drawings. It should be noted that constituent elements denoted by the same reference numerals in the embodiments perform similar operations, and thus a description thereof may not be repeated.

Embodiment 1

FIG. 1 is a block diagram of a program pattern analyzing apparatus in this embodiment.

The program pattern analyzing apparatus includes a pattern information storage portion 101, a source program accepting portion 102, a comparing portion 103, a pattern appearance status accumulating portion 104, a pattern appearance status storage portion 105, a counting portion 106, and an output portion 107.

In the pattern information storage portion 101, one or more pieces of first command pattern information, which is information indicating a command pattern of a first source program that is to be converted in a case where the first source program is converted into a second source program, can be stored. Specific examples of the first command pattern information include information indicating at least one of a pattern in which reserved words appear, a pattern in which non-reserved words appear, and a pattern in which reserved words and non-reserved words appear, in the first source program. The reserved word is a lexical element (e.g., a word) that cannot be used as an identifier name such as a variable name, a function name, or a class name prescribed in the specification and the like of a programming language. In the pattern information storage portion 101, for example, the command pattern information of a first source program that needs to be converted is accumulated via an accepting portion (not shown) or the like. It should be noted that in the pattern information storage portion 101, first command pattern information of a first source program, and second command pattern information indicating a command pattern of a second source program, into which the first command pattern information is to be converted, can be stored in association with each other. Each of the first source program and the second source program may be a source program in any language such as COBOL language, C language, or perl language. Furthermore, the first source program and the second source program may be a script or the like. Herein, it is assumed that the first source program and the second source program are source programs respectively functioning as a so-called migration source and a so-called migration destination. The pattern information storage portion 101 can be realized either as a non-volatile storage medium or a volatile storage medium.

The source program accepting portion 102 accepts a first source program. This acceptance is, for example, acceptance from an input unit, receiving an input signal transmitted from another device or the like, or reading information from a storage medium or the like. There is no limitation on the input unit, and a numeric keypad, a keyboard, a mouse, a menu screen, and the like may be used. The source program accepting portion 102 may be realized as a device driver of a communication device, a device that reads information, or the like, a device driver of an input unit such as a numeric keypad or a keyboard, control software of a menu screen, or the like.

The comparing portion 103 compares the first source program with the first command pattern information stored in the pattern information storage portion, for each execution unit, which is a unit in execution of the first source program. Specific examples of the execution unit include a row of the first source program. Rows may be delimited according to the language of the first source program, for example, they may be delimited by the row number or may be delimited by control symbols such as semicolons. More specifically, the comparing portion 103 compares each execution unit of the first source program with one or more pieces of the first command pattern information stored in the pattern information storage portion 101, and judges whether or not they match each other. Herein, a match that is judged by the comparing portion 103 may be a full match or may be a partial match. In this embodiment, in particular, a case will be described in which the comparing portion 103 judges at least one of a match between a pattern in which reserved word portions of the first command pattern information appear and a pattern in which reserved word portions in the execution unit of the first source program appear, a match between a pattern in which non-reserved word portions of the first command pattern information appear and a pattern in which non-reserved word portions in the execution unit of the first source program appear, and a match between a pattern in which reserved words and non-reserved words of the first command pattern information appear and a pattern in which reserved words and non-reserved words in the execution unit of the first source program appear. More specifically, if the appearance patterns of the reserved words, the appearance patterns of the non-reserved words, or the appearance patterns of the reserved words and the non-reserved words fully match each other, the execution unit of the first source program and the first command pattern information that are subjected to the comparison are considered to match each other. This appearance pattern is a pattern that also includes the arrangement order between the reserved words and between the reserved words and the non-reserved words. The appearance pattern may be a pattern in which specific reserved words or non-reserved words appear, or may be a pattern in which unspecific reserved words or non-reserved words appear. Also, the appearance pattern may be a combination of these patterns. The comparing portion 103 may be typically realized as an MPU, a memory, or the like. Typically, the processing procedure of the comparing portion is realized by software, and the software is stored in a storage medium such as a ROM. Note that the processing procedure also may be realized by hardware (dedicated circuit).

The pattern appearance status accumulating portion 104 accumulates the execution unit of the first source program judged by the comparing portion 103 to match any one piece of the first command pattern information, in association with the first command pattern information judged to match the execution unit. Furthermore, the execution unit of the first source program judged to match none of the first command pattern information is accumulated in association with information indicating that there is no match, for example, the information 'no match' or 'else'. The accumulation in association with the information is, for example, accumulating the execution unit of the first source program and the first command pattern information that match each other, as two attribute values in the same record. Herein, a case will be described in which the pattern appearance status accumulating portion 104 accumulates information in the pattern appearance status storage portion 105, but there is no limitation on a portion in which the information is accumulated. This accumulation is a concept that also includes accumulation for temporary storage. The pattern appearance status accumulating portion 104 may be typically realized as an MPU, a memory, or the like. Typically, the processing procedure of the pattern appearance status accumulating portion is realized by software, and the software is stored in a storage medium such as a ROM. Note that the processing procedure also may be realized by hardware (dedicated circuit).

In the pattern appearance status storage portion 105, the execution unit of the first source program and the first command pattern information that are judged to match each other as a result of the comparison performed by the comparing portion 103 are accumulated in association with each other by the pattern appearance status accumulating portion 104. This storage is a concept that also includes temporary storage. The pattern appearance status storage portion 105 can be realized as a non-volatile storage medium or a volatile storage medium.

The counting portion 106 counts the number of times the same first command pattern appears, among the first command patterns accumulated in association with the execution units of the first command pattern information by the pattern appearance status accumulating portion 104, using the information accumulated by the pattern appearance status accumulating portion 104. If the first command pattern appears only once, the number of times the first command pattern appears may be counted as once, or may not be counted. The counting portion 106 may be typically realized as an MPU, a memory, or the like. Typically, the processing procedure of the counting portion 106 is realized by software, and the software is stored in a storage medium such as a ROM. Note that the processing procedure also may be realized by hardware (dedicated circuit).

The output portion 107 outputs the information accumulated by the pattern appearance status accumulating portion 104. The information accumulated by the pattern appearance status accumulating portion 104 is referred to as pattern appearance status information. More specifically, the execution unit of the first source program and the first command pattern information, that are judged to match each other as a result of the comparison performed by the comparing portion 103 and that are accumulated in association with each other by the pattern appearance status accumulating portion 104 in the pattern appearance status storage portion 105, are read and output. Furthermore, the output portion 107 may output a result of the counting performed by the counting portion 106 for each first command pattern, in addition to the information accumulated by the pattern appearance status accumulating portion 104, or instead of the information accumulated by the pattern appearance status accumulating portion 104. Furthermore, only if the first command pattern appears N (N is 1 or more) times or more, the result obtained by counting the number of times of appearance may be output, in the result of the counting performed by the counting portion 106. Regarding the judgment, a value of the counting result of the counting portion 106 and N may be compared, and the counting result together with the corresponding first command pattern may be output only if the value is N or more. This output is a concept that includes displaying on a display screen, printing by a printer on paper or the like, accumulation in a storage medium or the like, transmission to an external device, and the like. The output portion 107 may be considered to include or not to include an output device such as a display screen or a printer. The output portion 107 may be realized as driver software for an output device, or a combination of driver software for an output device and the output device. Furthermore, the output portion 107 may include an MPU, a memory, or the like for judging whether or not the number of times of appearance in the counting result is N or more.

Next, the operation of the program pattern analyzing apparatus will be described with reference to the flowchart in FIG. 2. Herein, as an example, a case will be described in which the execution unit of the first source program is a row.

(step S201) The source program accepting portion 102 accepts a first source program. The first source program is a program that is to be converted and that is to be analyzed. For example, if the first source program is stored in a memory or the like, the source program accepting portion 102 accepts the first source program by reading it from the memory or the like.

(step S202) The comparing portion 103 reads one or more pieces of the first command pattern information stored in the pattern information storage portion 101.

(step S203) The comparing portion 103 substitutes 1 for a counter i. This counter is a program counter of the first source program read in step S201. That is to say, the comparing portion 103 analyzes the $i^{th}$ row of the first source program read in step S201 through the following process. Herein, it is assumed that the program is a program having a pattern in which one row represents one command.

(step S204) The comparing portion 103 judges whether or not the $i^{th}$ source row is present in the first source program read in step S201. If the $i^{th}$ source row is present, the procedure proceeds to step S205. If the $i^{th}$ source row is not present, the procedure proceeds to step S209.

(step S205) The comparing portion 103 substitutes 1 for a counter j. The counter j is a counter for acquiring first command pattern information used for comparison, among the one or more pieces of first command pattern information read in step S202.

(step S206) The comparing portion 103 judges whether or not the $i^{th}$ source row is a row that matches the $j^{th}$ first command pattern. If the $i^{th}$ source row matches the $j^{th}$ first command pattern, the procedure proceeds to step S207. If the $i^{th}$ source row does not match the $j^{th}$ first command pattern, the procedure proceeds to step S212. It should be noted that whether or not the $i^{th}$ source row matches the $j^{th}$ first command pattern can be judged by syntax analysis, lexical analysis, or the like. Specific examples thereof will be described later.

(step S207) The pattern appearance status accumulating portion 104 accumulates the $i^{th}$ source row and the $j^{th}$ first command pattern in association with each other in the pattern appearance status storage portion 105. Instead of the source row and the first command pattern, identification information respectively corresponding to the source row and the first command pattern, for example, the row number of the source row and the ID of the first command pattern may be accumulated in association with each other.

(step S208) The comparing portion 103 increments the counter i by 1. The procedure returns to step S204.

(step S209) The counting portion 106 counts the number of times the same first command pattern appears, among the first command patterns stored in association with the source rows in the pattern appearance status storage portion 105. There is no limitation on the counting method. For example, the number of times of appearance may be counted, by sequentially reading the first command pattern information from the pattern information storage portion 101, and counting the number of times the first command pattern that matches the read first command pattern information is read from the pattern appearance status storage portion 105. Also, the number of times of appearance may be counted, by sequentially reading the first command patterns stored in the pattern appearance status storage portion 105, and counting the number of times the first command pattern that matches the read first command pattern is read from the pattern appearance status storage portion 105. In this case, information such as a flag is added so that a first command pattern that has been already subjected to counting is not read again. The counting portion 106 temporarily stores the counting result, for example, in a memory (not shown) or the like.

(step S210) The output portion 107 outputs, for example, displays information associating the source row and the first command pattern that match each other, and information associating the source row and information indicating that there is no first command pattern that matches the source row, which have been accumulated by the pattern appearance status accumulating portion 104 in steps S207 and S214.

(step S211) The output portion 107 outputs, for example, displays a result of the counting performed by the counting portion 106 in step S209, in association with the first command pattern. The process ends.

(step S212) The comparing portion 103 increments the counter j by 1.

(step S213) The comparing portion 103 judges whether or not the $j^{th}$ first command pattern is present in the first command pattern read in step S202. If the $j^{th}$ first command pattern is present, the procedure returns to step S206. If the $j^{th}$ first command pattern is not present, the procedure proceeds to step S214.

(step S214) The comparing portion 103 accumulates information indicating that there is no first command pattern that matches the $i^{th}$ source row, in association with the $i^{th}$ source row. The procedure proceeds to step S208.

It should be noted that in step S210, for each first command pattern, whether or not a value of a result obtained by counting the number of times of appearance in step S209 is preset N (N is 1 or more) or more may be judged, and the value of the counting result may be output in association with the first command pattern only if the value is N or more.

Figure 2:
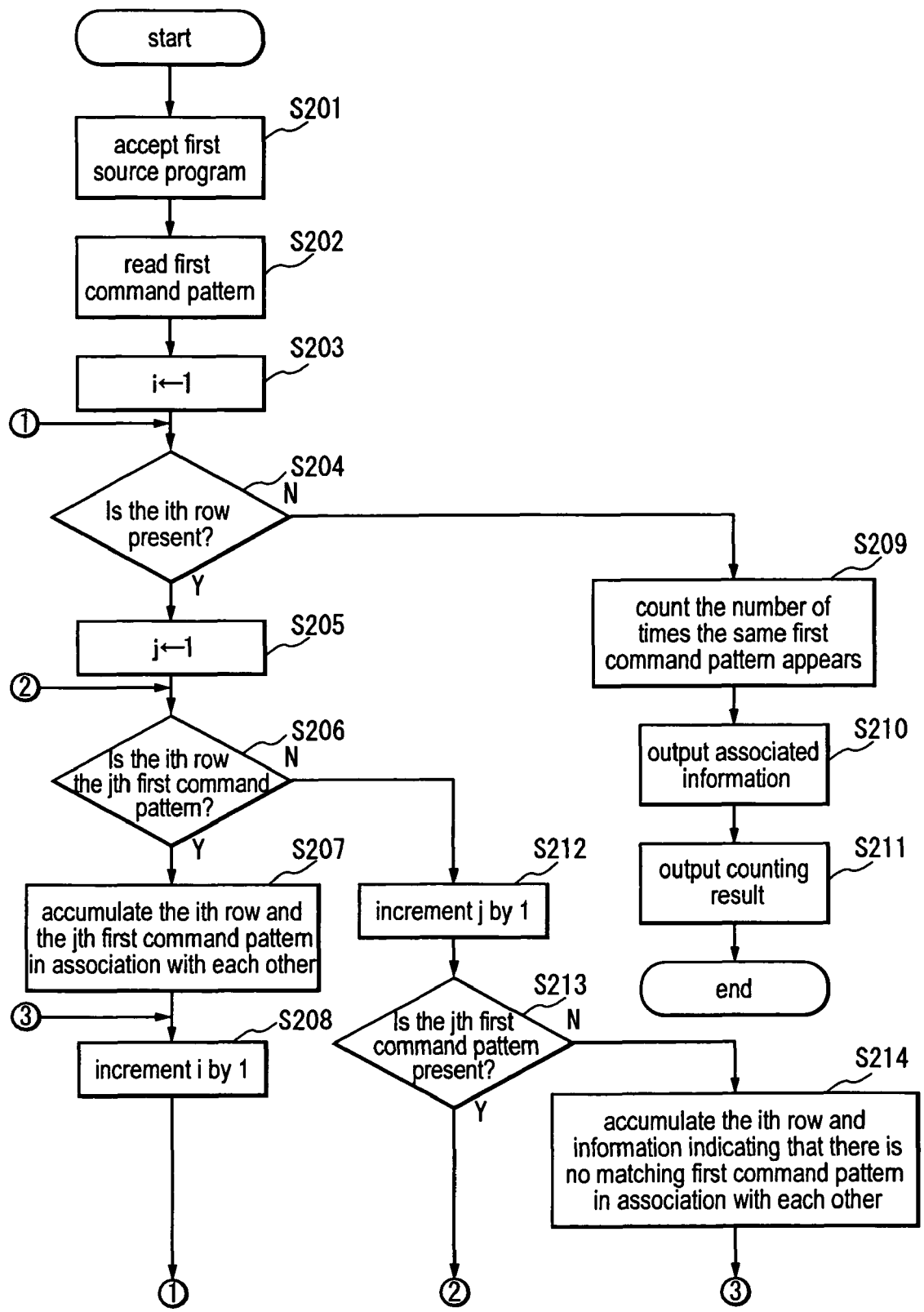
FIG. 2 is a flowchart illustrating an operation of the program pattern analyzing apparatus in this embodiment.

Furthermore, in the flowchart in FIG. 2, if output and the like of the result obtained by counting the first command pattern are not necessary, the process in step S209 and the like may be omitted.

Furthermore, in the flowchart in FIG. 2, if only the result obtained by counting the first command pattern that appears is output, the process in step S214 and the like may be omitted.

Note that the process is ended by powering off or interruption for aborting the process in the flowchart in FIG. 2.

Hereinafter, a specific operation of the program pattern analyzing apparatus in this embodiment will be described. FIG. 3 is a command pattern information management table stored in the pattern information storage portion 101. In the command pattern information management table, multiple records having 'ID' and 'first command pattern' are stored. 'ID' refers to information for identifying a record, and is information used for managing the table. 'First command pattern' refers to an attribute in which first command pattern information is stored. The first command pattern information herein is constituted by a reserved word, or a combination of a reserved word and a non-reserved word. In the first command pattern information, a reserved word is represented by a string of English capital letters, and a non-reserved word is represented by Italic type letters, or a combination of Italic type letters and numeric characters. For example, in 'SELECT VARIABLE01 ASSIGN TO VARIABLE02', 'SELECT', 'ASSIGN', and 'TO' are reserved words, and 'VARIABLE01' and 'VARIABLE2' are non-reserved words. The non-reserved words correspond to the regular expression. The non-reserved words represent a character string constituted by at least one character, for example, '[a-z, A-Z, 0-9 . . . ]*', that is, any one of the lower-case alphabet letters a to z, the capital alphabet letters A to Z, the numeric characters 0 to 9, and the like. Herein, specifies the number of characters of 1 or more.

FIG. 4 is an example of a source program accepted by the source program accepting portion 102. Herein, a case will be described in which the program pattern analyzing apparatus accepts the program in FIG. 4 and starts an analysis in response to an instruction from the user. In the source program in FIG. 4, a row beginning with '*' is a comment row. In this source program, the row number is provided for each row functioning as the execution unit. Typically, source code in each row can be read by reading the source code in the unit of the row number. If a given control symbol or the like is contained, multiple rows may be judged to be one execution unit. If a row is judged to be a comment row, the program pattern analyzing apparatuses does not analyze the row.

First, in response to an instruction or the like from the user, the source program accepting portion 102 reads a source program as shown in FIG. 4 from a memory or the like, and accepts the source program. The accepted source program is temporarily stored in a memory (not shown) or the like.

Next, the comparing portion 103 reads the first command pattern information from the pattern information storage portion 101. The read information is temporarily stored in a memory (not shown) or the like.

Next, the comparing portion 103 reads the $1^{st}$ row of the source program in FIG. 4 temporarily stored in the memory or the like. The $1^{st}$ row is a comment row including '*', and thus the comparing portion 103 reads the next row. That is to say, the program counter is incremented. The $2^{nd}$ to $8^{th}$ rows are also comment rows, and thus the comparing portion 103 does not perform comparison.

Next, the comparing portion 103 reads 'IDENTIFICATION DIVISION' in the $9^{th}$ row of the source program. Next, the comparing portion 103 performs comparison, herein, pattern matching between the read row and each piece of first command pattern information.

More specifically, the first character string in the $9^{th}$ row of the source program is acquired. Herein, the first character string is 'IDENTIFICATION'. Next, the $1^{st}$ record of the first command pattern information shown in FIG. 3 is read. Then, the first character string in the $9^{th}$ row of the source program and the first character string in the $1^{st}$ record of the first command pattern information are compared. Herein, the first character string in the $1^{st}$ record of the first command pattern information is 'IDENTIFICATION', which is a reserved word. Thus, this reserved word and the first character string in the $1^{st}$ record of the first command pattern information are compared, and it is judged whether or not they fully match each other. Herein, it is assumed that one character string, that is, a reserved word and a non-reserved word is judged to be delimited, herein, according to spaces. It is judged that the first character string of the source code in the $9^{th}$ row of the source program and the first character string in the $1^{st}$ record of the first command pattern information match each other. Thus, the next character string of the source code in the $9^{th}$ row of the source program is subjected to comparison. Herein, the second character string of the source code in the $9^{th}$ row of the program is 'DIVISION', and the second character string in the $1^{st}$ record of the first command pattern information is 'DIVISION', which is a reserved word. Thus, they are compared, and it is judged whether or not they match each other. Herein, it is judged that they match each other. Since the next character string is not present in the source code in the $9^{th}$ row of the program, and the next character string is not present either in the $1^{st}$ record of the first command pattern, it is judged that the first command pattern in the $1^{st}$ record of the first command pattern information and the source code in the $9^{th}$ row of the source program match each other, and the comparison ends.

Then, the pattern appearance status accumulating portion 104 accumulates the source code in the $9^{th}$ row of the source program and the first command pattern in the $1^{st}$ record of the first command pattern information in association with each other in the pattern appearance status storage portion 105.

FIG. 5 is a pattern appearance status management table for managing the correspondence between the row of the source program and the first command pattern that are accumulated in the pattern appearance status storage portion 105. In the pattern appearance status management table, records having 'source ID', 'row number', 'source code', and 'first command pattern' can be stored. 'Source ID' refers to information for identifying a source program. Herein, it is assumed that the identification information of the source program shown in FIG. 4 is 'PSD712'. 'Source ID' here may be obtained by acquiring the file name or the like from the source program, or may be specified by the user or the like. Also, the identification information of the source code described in the source program may be acquired by way of a search or the like. 'Row number' refers to the row number of a row that is to be analyzed. That is to say, 'row number' refers to the row numbers of rows excluding comment rows and the like. 'Source code' refers to source code actually described in a row specified with the row number. 'First command pattern' refers to a first command pattern judged to correspond to 'source code' in the same record as a result of the comparison performed by the comparing portion 103. In the pattern appearance status management table, a record is sequentially increased each time a row of the source program is analyzed.

Next, the comparing portion 103 reads 'PROGRAM-ID PSD712' in the $10^{th}$ row of the source program. Next, the comparing portion 103 compares the read row with each piece of first command pattern information.

More specifically, the first character string in the $10^{th}$ row of the source program is acquired. Herein, the first character string is 'PROGRAM-ID'. Next, the $1^{st}$ record of the first command pattern information shown in FIG. 3 is read. Then, the first character string in the $10^{th}$ row of the source program and the first character string in the $1^{st}$ record of the first command pattern information are compared. Herein, the first character string in the 1st record of the first command pattern information is 'IDENTIFICATION', which is a reserved word. Thus, this reserved word and the first character string in the 1st record of the first command pattern information are compared, and it is judged whether or not they fully match each other. Herein, it is judged that they do not match each other. Next, the first character string in the 10th row of the source program and the first character string in the next record of the first command pattern information are compared. The first character string in the 2nd record is 'CONFIGURATION', which is a reserved word. Thus, also in this case, it is judged that they do not match each other. Next, the first character string in the 10th row of the source program and the first character string in the next record, that is, the 3rd record of the first command pattern information are compared. Herein, the first character string in the 3rd record is 'PROGRAM-ID', which is a reserved word. Thus, it is judged that the first character string in the 3rd record matches the first character string in the 10th row of the source program. Next, 'PSD712', which is the second character string of the 10th row of the source program, and the second character string in the 3rd record of the first command pattern information are compared. Herein, the second character string in the 3rd record is a character string 'VARIABLE01' specifying a non-reserved word, and corresponds to the regular expression representing a character string group. Thus, if 'PSD712', which is the second character string of the 10th row of the source program, is a character string satisfying the regular expression, it is judged that they match each other. Herein, 'PSD712' is a character string satisfying the regular expression. Thus, it is judged that 'PSD712', which is the second character string of the 10th row of the source program, and the second character string in the 3rd record of the first command pattern information match each other. Since the third character string is not present in the 10th row of the source program, and the third character string is not present either in the 3rd record of the first command pattern information, it is judged that the source code in the 10th row of the source program and the first command pattern in the 3rd record of the first command pattern information match each other, and the comparison ends.

Then, the pattern appearance status accumulating portion 104 accumulates the source code in the 10th row of the source program and the first command pattern in the 3rd record of the first command pattern information in association with each other in the pattern appearance status storage portion 105.

Next, the comparing portion 103 reads 'ENVIRONMENT DIVISION' in the 12th row of the source program, because the 11th row of the source program is a comment row. Next, the comparing portion 103 compares the read row with each piece of first command pattern information.

More specifically, the first character string in the 12th row of the source program is acquired. Herein, the first character string is 'ENVIRONMENT'. Then, the 1st record of the first command pattern information shown in FIG. 3 is read. Then, the first character string in the 12th row of the source program and the first character string in the 1st record of the first command pattern information are compared. Herein, the first character string in the 1st record of the first command pattern information is 'IDENTIFICATION', which is a reserved word. Thus, this reserved word and the first character string in the 1st record of the first command pattern information are compared, and it is judged whether or not they fully match each other. Herein, it is judged that they do not match each other. Hereinafter, in a similar manner, the first character string in the 12th row of the source program and the first character string in the 2nd and the following records of the first command pattern information are compared, and the records that match the source program are detected. Herein, if there is no matching record, the comparing portion 103 judges that there is no first command pattern that matches the 12th row of the source program, and the comparison ends.

Then, the pattern appearance status accumulating portion 104 accumulates a value indicating that there is no matching first command pattern, for example, 'else' in association with the source code in the 12th row of the source program in the pattern appearance status storage portion 105.

Hereinafter, a similar process is performed for all rows in the source program shown in FIG. 4, and the comparison process by the comparing portion 103 ends.

FIG. 6 is the pattern appearance status management table in a state where the comparison process ends. This pattern appearance status management table corresponds to the above-mentioned pattern appearance status information. This pattern appearance status management table has records corresponding to all rows excluding comment rows in the source program.

Next, the counting portion 106 counts the number of times the same first command pattern appears, in the attribute 'first command pattern' in the pattern appearance status management table shown in FIG. 6. For example, 'IDENTIFICATION DIVISION', which is an attribute value of the attribute 'first command pattern' in the 1st record in the pattern appearance status management table, is read, and the number of records whose attribute 'first command pattern' fully matches 'IDENTIFICATION DIVISION' is counted in the 2nd and the following records. Then, in a similar manner, the counting is performed also with respect to the 2nd and the following records. It should be noted that information indicating that the counting has been already performed such as flag information is added so that counting is not performed again on a record judged to have the attribute 'first command pattern' that fully matches the attribute 'first command pattern' of another record. Accordingly, with respect to the attribute 'first command pattern' of a record to which this information is added, the number of times the same first command pattern appears is not counted. Furthermore, the number of records in which the attribute 'first command pattern' is 'else' is not counted either. The counting portion 106 temporarily stores the counting result in association with the first command pattern in a memory (not shown) or the like.

FIG. 7 is a counting result management table for managing the result obtained by counting the number of times the first command pattern appears, which is performed by the counting portion 106. In the counting result management table, multiple records having 'source ID', 'pattern ID', 'first command pattern', and 'number of times of appearance' are stored. 'Source ID' refers to information for identifying a source program. 'Pattern ID' refers to identification information provided for identifying a first command pattern used in a source program. 'First command pattern' refers to a first command pattern used in a source program. 'Number of times of appearance' refers to a value of a result obtained by counting the number of times the first command pattern appears.

Next, the output portion 107 displays using a display screen or the like or prints using a printer or the like the pattern appearance status management table as shown in FIG. 6 and the counting result management table as shown in FIG. 7.

It should be noted that in the foregoing specific example, only the records in which 'number of times of appearance' is a given value N (N is an integer of 1 or more) or more may be extracted from the counting result management table, and an extracted counting result management table, which is a table constituted by the extracted records, may be displayed on a display screen or the like or printed by a printer or the like. The value N may be set in advance in a memory (not shown) or the like, or may be accepted from the user via an accepting portion (not shown) or the like as appropriate. For example, the necessity to perform the process using an automatic conversion tool is not high for a pattern, such as a first command pattern that appears once, for which an effort to register the pattern for converting the first command pattern and an effort to manually convert the actual first source program are the same. Furthermore, if such a pattern is converted using an automatic conversion tool, an effort required may be increased by the amount of an effort to check whether or not the automatic conversion has been performed properly, after the conversion. Thus, such a pattern does not have to be considered as a command pattern that is to be processed using the automatic conversion tool. Accordingly, in particular, in a case where N is set to a value of 2 or more, if records of first command patterns that appear less than N times are set so that they are not displayed, that is, first command patterns that do not have to be considered in conversion are set so that they are not displayed, the user can easily judge a method and the like for converting the source program.

As described above, according to this embodiment, source code in each row of the first source program judged to match any one of the first command patterns is output in association with the first command pattern judged to match the source code, and source code in each row of the first source program judged to match none of the first command patterns is output in association with information indicating that there is no match, and thus what kind of first command pattern appears in which row of the source program can be judged and confirmed. Accordingly, in converting a source program, for example, what kind of conversion to perform, or what kind of automatic conversion tool and the like to use can be properly determined. As a result, a source program can be efficiently converted. Furthermore, whether or not the correspondence between each row of the source program and the first command pattern is properly established can be confirmed.

Furthermore, according to this embodiment, the effect of automatic conversion of source code using a tool can be determined. Furthermore, due to determination of the effect, the pattern analyzing apparatus in this embodiment is effective in a case where an automatic conversion tool is developed, in a case where the number of steps in transferring source code is estimated, and the like.

Furthermore, the pattern analyzing apparatus in this embodiment can be used to determine the standardization status of source code, that is, the quality of the source code. For example, if the number of matching first command patterns is small in source code, it can be judged that standardization of the source code has not been completed.

Furthermore, according to this embodiment, based on the output result, source code deviating from coding standardization can be confirmed, and the appearance frequency can be checked. Accordingly, for example, peculiar characteristics of programming performed by a programmer or unique rules and the like in coding can be determined. Thus, a proper conversion method can be selected, and a proper automatic conversion tool can be developed.

Furthermore, in this embodiment, based on information indicating that there is no matching first command pattern, for example, 'else', a row or source code that has no matching first command pattern can be recognized. Accordingly, based on the row or source code, it is possible to determine what kind of patterns exist as command patterns other than the first command patterns stored in the pattern information storage portion 101. Thus, for example, command patterns that seem to be preferably registered newly as the first command pattern information can be extracted and added to the first command patterns. Accordingly, the first command pattern information stored in the pattern information storage portion 101 can be optimized according to the source program. In this manner, if an analysis similar to that described above is performed again using the first command pattern information with feedback of the analysis result, the number of rows that have no matching first command pattern can be reduced, and thus what kind of conversion to perform and the like can be more accurately analyzed.

Furthermore, in this embodiment, the command pattern information stored in the pattern information storage portion 101 is used to analyze a source program, and thus if the command pattern information stored in the pattern information storage portion 101 is changed, source programs can be analyzed in changing various languages of the source programs into other languages. Accordingly, high versatility can be obtained. Furthermore, if the command pattern information is added and updated, the analysis can be more precisely performed.

Furthermore, if the number of times the first command pattern appears in a source program is counted and output, which first command pattern appears at which frequency can be easily determined. Accordingly, in converting a source program, for example, what kind of conversion to perform, or what kind of automatic conversion tool and the like to use can be properly judged.

It should be noted that in the foregoing specific example, information constituting a row that is an execution unit of the first source program, that is, source code, associated with information indicating that there is no match and accumulated in the pattern appearance status storage portion 105, may be read by the output portion 107 from the pattern appearance status storage portion 105 and output. As a specific example, among records in the pattern appearance status management table shown in FIG. 6, a record in which a value of the attribute 'first command pattern' is a value indicating that there is no matching first command pattern, for example, 'else' may be read by way of a search or the like, that is, extracted, for example, by the output portion 107, and a table constituted by the extracted records may be output. If such information is used, it is possible to easily determine what kind of patterns exist as command patterns other than the first command patterns stored in the pattern information storage portion 101. Thus, extraction of command patterns that seem to be preferably registered newly as the first command patterns, and addition of the extracted command patterns to the first command patterns can be easily and promptly performed.

In the foregoing embodiment, each process (each function) may be realized by integrated processing using a single apparatus (system), or may be realized by distributed processing using multiple apparatuses.

Furthermore, in the foregoing embodiment, each constituent element may be constituted by dedicated hardware, or alternatively, constituent elements that can be realized by software may be realized by executing a program. For example, each constituent element may be realized by a program execution portion such as a CPU reading out and executing a software program stored in a storage medium such as a hard disk or a semiconductor memory.

Herein, the software that realizes the program pattern analyzing apparatus in the foregoing embodiment may be a following program. Specifically, this program is a program for causing a computer to function as: a source program accepting portion that accepts a first source program; a comparing portion that compares the first source program, for each execution unit, which is a unit in execution of the first source program, with one or more pieces of stored first command pattern information, which is information indicating a command pattern of a first source program that is to be converted in a case where the first source program is converted into a second source program; a pattern appearance status accumulating portion that accumulates an execution unit of the first source program judged by the comparing portion to match any one piece of the first command pattern information, in association with the first command pattern information judged to match the execution unit, and accumulates an execution unit of the first source program judged by the comparing portion to match none of the first command pattern information, in association with information indicating that there is no match; and an output portion that outputs the information accumulated by the pattern appearance status accumulating portion.

Furthermore, in this program, the program causes the computer to further function as a counting portion that counts the number of times the same first command pattern appears, among first command patterns accumulated in association with the execution units of the first command pattern information by the pattern appearance status accumulating portion, using the information accumulated by the pattern appearance status accumulating portion, and the output portion outputs a result of counting performed by the counting portion for each first command pattern.

In this program, functions realized by the program do not include a function realized only by hardware. For example, a function realized only by hardware such as a modem or an interface card in an accepting portion that accepts information, an output portion that outputs information, and the like is not included in the functions realized by the program.

Furthermore, this program may be executed by downloading from a server or the like, or may be executed by reading a program stored on a given storage medium (e.g., an optical disk such as a CD-ROM, a magnetic disk, a semiconductor memory, etc.).

Furthermore, the computer that executes this program may be a single computer or multiple computers. More specifically, centralized processing may be performed, or distributed processing may be performed.

Furthermore, in the foregoing embodiment, it will be appreciated that two or more communication units (information transmitting portions, etc.) in one apparatus may be physically realized as one medium.

The present invention is not limited to the embodiments set forth herein. It will be appreciated that various modifications are possible within the scope of the present invention.

Furthermore, in the foregoing embodiment, the case was described in which the program pattern analyzing apparatus is a stand-alone apparatus, but the program pattern analyzing apparatus may be a stand-alone apparatus, or may be a server apparatus in a server-client system. In the latter case, the output portion outputs a screen, and the accepting portion accepts input, via a communication line.

Embodiment 2

With a program pattern analyzing apparatus and the like according to this embodiment, information functioning as a conversion unit fetched from a first source program and first command pattern information are compared, and if they do not match each other, command pattern information corresponding to the conversion unit information is added to the first command pattern information. If there is a difference between descriptions of term definitions, processing contents, or the like between a description in Embodiment 1 and a description in Embodiment 2, in referring to a detailed description of the present invention in order to interpret the meaning of terms in the scope of the present invention, a description in Embodiment 2 is prioritized.

Figure 8:
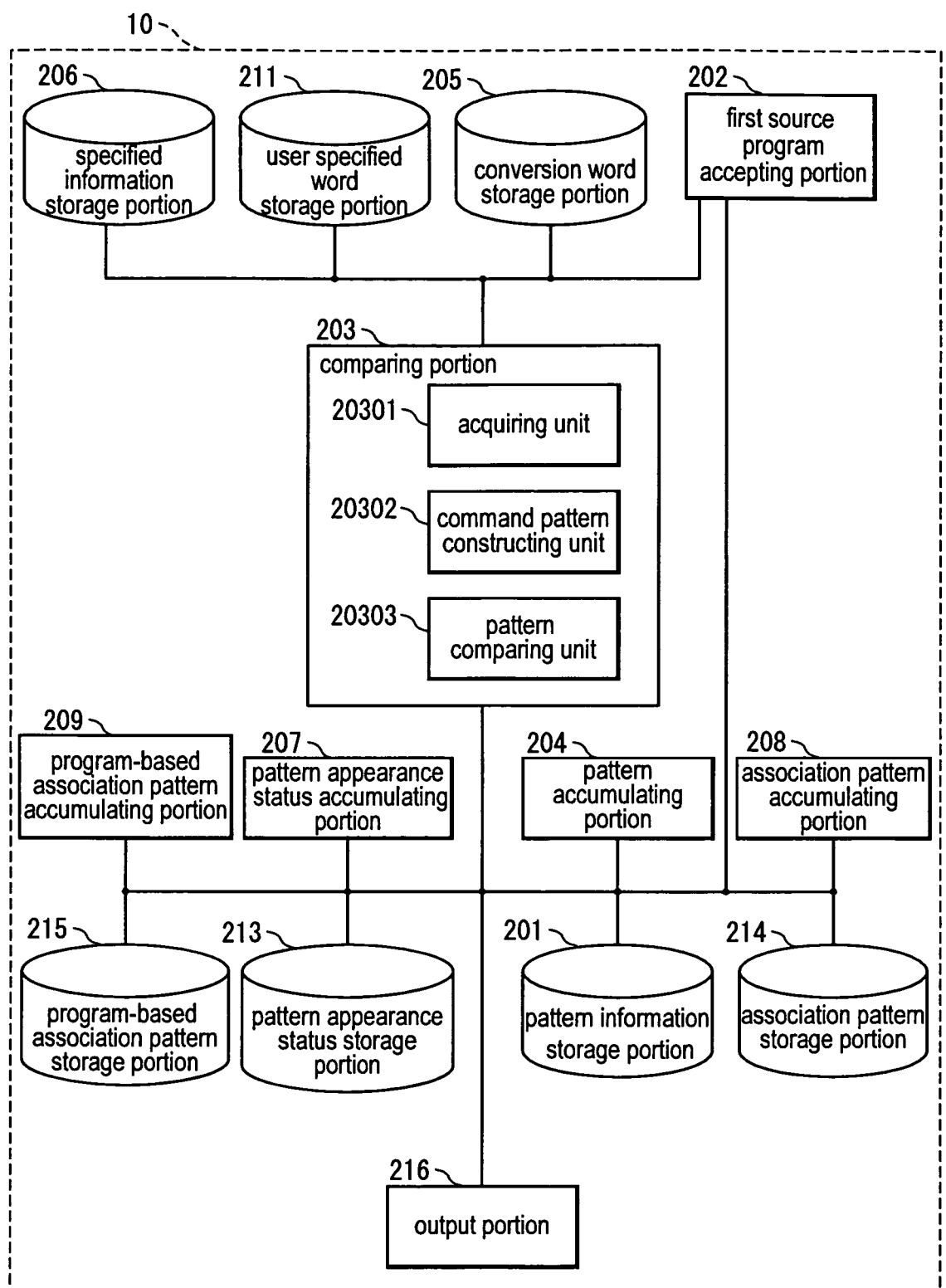
FIG. 8 is a block diagram of a program pattern analyzing apparatus in Embodiment 2.

FIG. 8 is a block diagram of a program pattern analyzing apparatus in this embodiment.

A program pattern analyzing apparatus 10 includes a pattern information storage portion 201, a first source program accepting portion 202, a comparing portion 203, a pattern accumulating portion 204, a conversion word storage portion 205, a specified information storage portion 206, a pattern appearance status accumulating portion 207, an association pattern accumulating portion 208, a program-based association pattern accumulating portion 209, a user specified word storage portion 211, a pattern appearance status storage portion 213, an association pattern storage portion 214, a program-based association pattern storage portion 215, and an output portion 216.

The comparing portion 203 includes an acquiring unit 20301, a command pattern constructing unit 20302, and a pattern comparing unit 20303.

In the pattern information storage portion 201, one or more pieces of first command pattern information, which is information indicating a command pattern of a first source program that is to be converted in a case where the first source program is converted into a second source program, can be stored. The 'case where a first source program is converted into a second source program' refers to, for example, a case where conversion for transferring a previous source program into a new source program, that is, a so-called migration or the like is performed. The command pattern in this embodiment is a pattern or the like in which information such as a character string appears in commands used in the first source program. The first command pattern information is, for example, information indicating a pattern or the like in which information such as a character string appears in commands that can be used in the first source program. Furthermore, the first command pattern information may be information in which part of information such as a character string that appears in commands, for example, a variable, a literal character, or a function name, is replaced by a prespecified lexical element (e.g., a word) for indicating that it is unfixed information. The information used for replacement herein is referred to as a conversion word, for example. The conversion word is preferably such that the data type, the data size, the attribute, or the like of information located at a position where the conversion word is located can be judged. The first command pattern information is, for example, constituted by a combination of at least one of a command word, a user specified word, a conversion word, and other character strings. The command word, the user specified word, the conversion word, and the like will be described later in detail. Furthermore, the command pattern may be considered as a pattern in which reserved words (e.g., a command word, etc.) appear, a pattern in which non-reserved words (e.g., a variable, a literal character, a function name, etc.) appear, or a pattern in which reserved words and non-reserved words appear, in the first source program. In this case, the first command pattern information may be, for example, information indicating at least one of a pattern in which reserved words appear, a pattern in which non-reserved words appear, and a pattern in which reserved words and non-reserved words appear, in the first source program. Specific examples of the first command pattern information include information 'command word <argument 1> <argument 2>' indicating the arrangement pattern of a reserved word and non-reserved words. In this case, 'command word' is a reserved word such as 'OPEN', 'MOVE', or 'CALL', and '<argument 1>' and '<argument 2>' are non-reserved words that are variable strings. Also, the first command pattern information may be information or the like indicating the order in which specific reserved words such as command words and unspecific reserved words are arranged. The reserved word is a lexical element that cannot be used as an identifier name such as a variable name, a function name, or a class name prescribed in the specification and the like of a programming language.

In the pattern information storage portion 201, for example, the first command pattern information of a first source program that needs to be converted is accumulated via an accepting portion (not shown) or the like. The first command pattern information of the first source program may be considered as the first command pattern information corresponding to the language and the like of the first source program, that is, information of a command pattern that may appear in the language and the like of the first source program. It should be noted that in the pattern information storage portion 201, first command pattern information of a first source program and second command pattern information indicating a command pattern of a second source program, into which the first command pattern information is to be converted, can be stored in association with each other. The second command pattern information is similar to the above-mentioned first command pattern information, except that the associated source program is a second source program. Each of the first source program and the second source program may be a source program in any language such as COBOL language, C language, or perl language. Furthermore, the first source program and the second source program may be a script or the like. Also, the first source program and the second source program may be a source program in a language obtained by customizing these languages. Herein, as an example, it is assumed that the first source program and the second source program are source programs respectively functioning as a so-called migration source and a so-called migration destination. The pattern information storage portion 201 can be realized either as a non-volatile storage medium or a volatile storage medium.

The first source program accepting portion 202 accepts a first source program. This acceptance is, for example, acceptance from an input unit, receiving an input signal transmitted from another device or the like, or reading information from a storage medium or the like. There is no limitation on the input unit, and a numeric keypad, a keyboard, a mouse, a menu screen, and the like may be used. The first source program accepting portion 202 may be realized as a device driver of a communication device, a device that reads information, or the like, a device driver of an input unit such as a numeric keypad or a keyboard, control software of a menu screen, or the like.

The comparing portion 203 fetches one or more pieces of conversion unit information, which is information of a conversion unit functioning as a unit in converting the first source program, from the first source program, and compares each piece of the fetched conversion unit information with the first command pattern information stored in the pattern information storage portion 201.

The conversion unit is, for example, an information unit in which the process is performed in a case where the first source program is converted into another source program such as the second source program. Specific example of the conversion unit may be considered to include a unit of information such as a character string in which conversion is performed in a case where the first source program is migrated. The conversion unit may be considered as a comparison unit, which is a unit in which comparison with the first command pattern information is performed by the comparing portion 203 in the first source program.

The conversion unit is, for example, a unit of information such as a character string determined according to a given rule, in the first source program. The given rule may be any rule. For example, the rule may be such that information in a range delimited by any one of one or more pieces of given information specified in advance by the user or the like in the first source program is to be regarded as the conversion unit information. Also, the rule may be such that information between given information and given information in the first source program is to be regarded as the conversion unit information. The given information is, for example, specified information described later. The conversion unit information may contain or may not contain this given information.

The conversion unit information is, for example, information in a range from the appearance of one piece of specified information to the next appearance of one piece of the specified information, in the first source program, the specified information being information specified in advance and stored in the specified information storage portion 206 or the like described later. Also, the conversion unit information may be considered as information delimited by the specified information, in the first source program. The information in a range from the appearance of one piece of the specified information to the next appearance of one piece of the specified information may contain or may not contain the former specified information. Furthermore, the information in a range from the appearance of one piece of the specified information to the next appearance of one piece of the specified information may contain or may not contain the latter specified information.

The specified information is, for example, information such as a character string specified by the user. Herein, the character string may be considered to include symbols such as periods and semicolons. The specified information may be, for example, control code such as line-feed code or TABs specified in advance. The control code such as line-feed code or TABs may be considered as the character string. Furthermore, the specified information may be, for example, the whole or part of command words used in the first source program, that is, command words used in the language and the like of the first source program. Furthermore, the specified information may be a combination of these pieces of information.

The above-mentioned given rule may not be the above-mentioned rule, for example, the given rule may be such that information delimited by the row number or the like is to be determined as the conversion unit information. That is to say, the above-mentioned given rule may be such that a row of the first source program is to be determined as the conversion unit information. The information indicating this rule may be stored in, for example, a memory (not shown) or the like.

For example, the comparing portion 203 fetches one or more pieces of conversion unit information that is information determined according to a rule specified in advance, from the first source program, and compares each piece of the fetched conversion unit information with the first command pattern information stored in the pattern information storage portion 201.

For example, the comparing portion 203 performs a search to detect information that matches the specified information stored in the specified information storage portion 206, from the first source program, fetches one or more pieces of conversion unit information, which is information in a range from the appearance of one piece of the specified information stored in the specified information storage portion 206 to the next appearance of one piece of the specified information, in the first source program, and compares each piece of the fetched conversion unit information with the first command pattern information stored in the pattern information storage portion 201.

Furthermore, the comparing portion 203 may, for example, perform a search on the first source program to detect one or more command words stored in the specified information storage portion 206, fetch one or more pieces of conversion unit information, which is information in a range from the appearance of one of the command words stored in the specified information storage portion 206 to the next appearance of one of the command words, in the first source program, and compare each piece of the fetched conversion unit information with the first command pattern information stored in the pattern information storage portion 201. This command word is a lexical token that can be the first lexical token in the conversion unit information, and is a lexical token that has a meaning as a source program. This command word is, for example, the whole or part of operators, command portions, or tokens. Also, the command word may be considered as a command word unique to a language such as COBOL. In this case, the specified information storage portion 206 may be considered as a storage portion of command words.

More specifically, the comparing portion 203 compares each piece of the conversion unit information of the first source program with one or more pieces of the first command pattern information stored in the pattern information storage portion 201, and judges whether or not they match each other. Herein, a match that is judged by the comparing portion 203 may be a full match or may be a partial match. Furthermore, the first command pattern information and the conversion unit information may be judged to match each other if part of the first command pattern information and part of the conversion unit information match each other. Also, the first command pattern information and the conversion unit information may be judged to match each other if their arrangements of reserved word or non-reserved words match each other. Also, the first command pattern information and the conversion unit information may be judged to match each other, for example, if their numbers and the like of command words and arguments match each other. Furthermore, herein, the first command pattern information and the conversion unit information may be judged to match each other if they correspond to each other.

There is no limitation on the manner in which the comparing portion 203 compares each piece of the conversion unit information of the first source program with one or more pieces of the first command pattern information stored in the pattern information storage portion 201. For example, the comparing portion 203 may change conversion unit information into comparison command pattern information, which is information indicating a command pattern corresponding to the conversion unit information, and compare the comparison command pattern information obtained by the change with the first command pattern information. The comparison command pattern information is, for example, information for indicating a command pattern as the above-mentioned first command pattern information. Furthermore, the comparing portion 203 may compare the conversion unit information with the first command pattern information as they are. For example, the comparing portion 203 may compare the whole of the conversion unit information with the whole of the first command pattern information as they are. Furthermore, in the comparison, a difference in prespecified symbols such as a space, the paragraph number, a comment, and the like may be removed, for example, deleted. Furthermore, the comparing portion 203 may, for example, compare a pattern in which the information other than unfixed information (hereinafter, referred to as fixed information) appears in the conversion unit information, the unfixed information being information such as a variable, a function name, or a literal character in which the user or the like can specify a value, a character string, or the like, with a pattern in which the fixed information appears in one or more pieces of the first command pattern information stored in the pattern information storage portion 201, and judge whether or not they match each other. Furthermore, the comparing portion 203 may judge a match between a pattern in which unfixed information portions in the first command pattern information appear and a pattern in which unfixed information portions in the conversion unit information of the first source program appear, or a match between a pattern in which the fixed information and the unfixed information in the first command pattern information appear and a pattern in which the fixed information and the unfixed information in the conversion unit information of the first source program appear. Furthermore, the judgment may be made according to a combination of these patterns. Furthermore, in the unfixed information, information specified by the user or the like, for example, a user specified word, which is a character string specified by the user, may be specified as the fixed information and used for the above-mentioned comparison and judgment. Furthermore, the comparing portion 203 may convert part or the whole of an unfixed word in the conversion unit information into a character string corresponding to the unfixed word, and compares the character string with the first command pattern information. Furthermore, in conversion into a character string corresponding to the unfixed word, the attribute, the data type, or the pattern of the unfixed word may be judged, and conversion may be performed into a character string specified according to the pattern.

More specifically, in the comparing portion 203, if the appearance patterns of the fixed information, the appearance patterns of the unfixed information, or the appearance patterns of the fixed information and the unfixed information fully match each other, the conversion unit information of the first source program and the first command pattern information that are subjected to the comparison are considered to match each other. This appearance pattern is, for example, a pattern that also includes the arrangement order and the like of the fixed information, of the unfixed information, and of the fixed information and the unfixed information. The appearance pattern may be a pattern in which specific fixed information or unfixed information appears, or may be a pattern in which unspecific fixed information or unfixed information appears. Also, the appearance pattern may be a combination of these patterns.

Furthermore, the comparing portion 203 may judge at least one of a match between a pattern in which reserved word portions of the first command pattern information appear and a pattern in which reserved word portions in the conversion unit information of the first source program appear, a match between a pattern in which non-reserved word portions of the first command pattern information appear and a pattern in which non-reserved word portions in the conversion unit information of the first source program appear, and a match between a pattern in which reserved words and non-reserved words of the first command pattern information appear and a pattern in which reserved words and non-reserved words in the conversion unit information of the first source program appear. More specifically, if the appearance patterns of the reserved words, the appearance patterns of the non-reserved words, or the appearance patterns of the reserved words and the non-reserved words fully match each other, the conversion unit information of the first source program and the first command pattern information that are subjected to the comparison may be considered to match each other. This appearance pattern is, for example, a pattern that also includes the arrangement order between the reserved words and between the reserved words and the non-reserved words. The appearance pattern may be a pattern in which specific reserved words or non-reserved words appear, or may be a pattern in which unspecific reserved words or non-reserved words appear. Also, the appearance pattern may be a combination of these patterns.

The comparing portion 203 may be typically realized as an MPU, a memory, or the like. Typically, the processing procedure of the comparing portion 203 is realized by software, and the software is stored in a storage medium such as a ROM. Note that the processing procedure also may be realized by hardware (dedicated circuit).

In this embodiment, a case will be described in which the comparing portion 203 includes the acquiring unit 20301, the command pattern constructing unit 20302, and the pattern comparing unit 20303, one or more pieces of conversion unit information acquired by the acquiring unit 20301 is changed by the command pattern constructing unit 20302 into comparison command pattern information, which is information indicating a command pattern corresponding to the conversion unit information, and the pattern comparing unit 20303 compares the comparison command pattern information obtained by the change with the first command pattern information.

The acquiring unit 20301 fetches conversion unit information, which is information of a conversion unit functioning as a unit in converting a first source program, from the first source program. For example, the acquiring unit 20301 fetches one or more pieces of conversion unit information that is information determined according to a rule specified in advance, from the first source program. As this rule, rules as described above can be applied. For example, the acquiring unit 20301 sequentially compares a lexical element (e.g., a word) constituting the first source program with the specified information stored in the specified information storage portion 206. Then, conversion unit information, which is information in a range from the appearance of one piece of the specified information stored in the specified information storage portion 206 to the next appearance of one piece of the specified information, in the first source program, is fetched. As a specific example, the specified information may be command words used in the first source program, and the acquiring unit 20301 may sequentially fetch conversion unit information, which is information in a range from the appearance of one of the command words stored in the specified information storage portion 206 to the next appearance of one of the command words, from the first source program. More specifically, information in a range from the appearance of one of the command words to a position immediately before the next appearance of one of the command words may be fetched. In this case, the conversion unit information contains the former command word, and does not contain the latter command word, that is, the conversion unit information contains only one command word. Furthermore, the acquiring unit 20301 may fetch information in a range from the appearance of one command word to a position that is immediately before the next appearance of a command word or that includes a period, or in a range from a position that is immediately after the appearance of one period to a position that is immediately before the appearance of a command word or that includes a period. Furthermore, in fetching information in a range from the appearance of one piece of the specified information to the next appearance of one piece of the specified information, the acquiring unit 20301 may delete information or the like unnecessary for the conversion process, for example, information of a line-feed code, the row number, a comment, a period, and the like, or replace this unnecessary information with information or the like specified in advance. The acquiring unit 20301 may be typically realized as an MPU, a memory, or the like. Typically, the processing procedure of the acquiring unit 20301 is realized by software, and the software is stored in a storage medium such as a ROM. Note that the processing procedure also may be realized by hardware (dedicated circuit).

The command pattern constructing unit 20302 constructs comparison command pattern information, by converting a character string that is not the user specified word and that matches a conversion condition associated with a conversion word, in the conversion unit information acquired by the acquiring unit 20301, into the conversion word associated with the conversion condition.

The conversion word is a character string associated with the conversion condition of a character string that may appear in the first source program. The conversion word is stored in, for example, the conversion word storage portion 205 described later. Furthermore, the conversion word can be stored in association with the conversion condition in the conversion word storage portion 205. More specifically, the conversion word is one or more character strings used for replacement of an unfixed word such as a variable, a function name, or a literal character described above. The conversion word is a character string indicating that an unfixed word having a given attribute, data type or the like is located in the comparison command pattern information or the like. More specifically, this replacement is performed according to which one of conversion conditions prepared in advance the unfixed word matches. The conversion condition is information specifying a rule in which the unfixed word appears, or the attribute, the data type, or the like of the unfixed word. The conversion condition is, for example, a combination of a clue character string, the position of a character string that is to be converted, and information for judging match or non-match. The clue character string is information that is used for specifying a character string that is to be converted, and that specifies a specific character string, the attribute of a character string, or the length of a character string. The clue character string may be also referred to as a clue phrase. The position of a character string is, for example, information indicating the position of a character string that is to be converted, relative to the clue character string, for example, before or after the clue character string, or the clue character string itself. The information for judging match or non-match is information specifying either a case where the clue character string and a character string in the conversion unit information match each other or a case where they do not match each other, as the case in which the condition is judged to be satisfied. If the conversion condition has such a configuration, the degree of freedom in specifying a character string that is to be converted is increased. More specifically, the conversion condition is information specifying a rule in which a variable or the like located after a prespecified character string is replaced by the conversion word 'VARIABLE ITEM', information specifying a rule in which a literal character is replaced by the conversion word 'CONSTANT' or the like, or information specifying a rule in which a variable in the uppermost-level among hierarchical numeric characters such as variables is replaced by the conversion word 'GROUP ITEM'. The command pattern constructing unit 20302 constructs the comparison command pattern information, by converting a character string that matches this sort of conversion condition and that is not the user specified word contained in the conversion unit information acquired by the acquiring unit 20301, into a conversion word associated with the conversion condition. The comparison command pattern information is information indicating a command pattern corresponding to the conversion unit information.

The user specified word is a character string specified by the user. The user specified word is, for example, a character string that is not wanted to be converted into the above-mentioned conversion word. For example, the user specified word is a character string that is not wanted to be converted into the above-mentioned conversion word, among character strings that can be converted into the conversion word, that is, character strings that match the above-mentioned conversion condition. For example, in a case where the conversion condition is set so that a literal character is converted into the conversion word 'CHARACTER ITEM', if the literal characters '"DDD"' are specified as the user specified word, the character string '"DDD"' in the conversion unit information is left as it is without conversion, and the other literal characters, for example, '"EEE"' and the like are converted into the character string 'CHARACTER ITEM'. Herein, it is assumed that a character string enclosed by '" "' is a literal character. The conversion word is stored in, for example, the conversion word storage portion 205 described later. Furthermore, the user specified word is stored in, for example, the user specified word storage portion 211 described later.

The command pattern constructing unit 20302 may construct the comparison command pattern information, by converting a character string that is not the user specified word stored in the user specified word storage portion 211 described later and that matches the conversion condition associated with the conversion word stored in the conversion word storage portion 205 described later, among character strings excluding at least part of the above-mentioned specified information stored in the specified information storage portion 206, in the conversion unit information acquired by the acquiring unit 20301, into the conversion word associated with the conversion condition.

Furthermore, the command pattern constructing unit 20302 may prepare exclusion specifying information indicating a command word or the like specified by the user, which is similar to the above-mentioned specified information stored in the specified information storage portion 206, in advance in a storage portion (not shown) or the like, and construct the comparison command pattern information, by converting a character string that is not the user specified word stored in the user specified word storage portion 211 described later and that matches the conversion condition associated with the conversion word stored in the conversion word storage portion 205 described later, among character strings excluding character strings indicated by the exclusion specifying information, in the conversion unit information acquired by the acquiring unit 20301, into the conversion word associated with the conversion condition.

Furthermore, the command pattern constructing unit 20302 may construct the comparison command pattern information, by converting a character string that is not the user specified word stored in the user specified word storage portion 211 described later and that matches the conversion condition associated with the conversion word stored in the conversion word storage portion 205 described later, among character strings excluding reserved words, in the conversion unit information acquired by the acquiring unit 20301, into the conversion word associated with the conversion condition.

The command pattern constructing unit 20302 may be typically realized as an MPU, a memory, or the like. Typically, the processing procedure of the command pattern constructing unit 20302 is realized by software, and the software is stored in a storage medium such as a ROM. Note that the processing procedure also may be realized by hardware (dedicated circuit).

The pattern comparing unit 20303 compares the comparison command pattern information constructed by the command pattern constructing unit 20302 with each piece of the first command pattern information stored in the pattern information storage portion 201. More specifically, the pattern comparing unit 20303 judges whether or not the comparison command pattern information constructed by the command pattern constructing unit 20302 and each piece of the first command pattern information stored in the pattern information storage portion 201 match each other, thereby judging whether or not the comparison command pattern information matches with any one piece of the first command pattern information stored in the pattern information storage portion 201. This match is typically a full match, but a mismatch of information or the like ignored in converting the source program, such as a space, the row number, a line-feed code, may be ignored. The process of judging whether or not pieces of command pattern information match each other can be performed using a known art, and thus a description thereof is omitted.

The pattern comparing unit 20303 may be typically realized as an MPU, a memory, or the like. Typically, the processing procedure of the pattern comparing unit 20303 is realized by software, and the software is stored in a storage medium such as a ROM. Note that the processing procedure also may be realized by hardware (dedicated circuit).

The pattern accumulating portion 204 accumulates the comparison command pattern information that is information indicating a command pattern corresponding to the conversion unit information judged by the comparing portion 203 to match none of the first command pattern information, as the first command pattern information, in the pattern information storage portion 201. There is no limitation on the manner in which the comparison command pattern information is acquired by the pattern accumulating portion 204. For example, the conversion unit information judged by the comparing portion 203 to match none of the first command pattern information may be acquired as it is as comparison command pattern information, or comparison command pattern information may be constructed from this conversion unit by deleting symbols such as a line-feed code unnecessary in converting the source program information or by providing character strings, symbols, or the like necessary for management and the like. Furthermore, comparison command pattern information may be constructed by the pattern accumulating portion 204 replacing part of the conversion unit information judged by the comparing portion 203 to match none of the first command pattern information, for example, the whole or part of the non-reserved words or the whole or part of the unfixed words described above, into a character string or the like specified in advance. If replacement is performed in this manner, the comparison command pattern information may be constructed from the conversion unit information using the conversion condition and the like as in the command pattern constructing unit 20302 described above. Furthermore, if the comparing portion 203 compares the comparison command pattern information constructed by the command pattern constructing unit 20302 with the first command pattern information as described above, comparison command pattern information judged to match none of the first command pattern information may be accumulated as it is in the pattern information storage portion 201.

The pattern accumulating portion 204 may be typically realized as an MPU, a memory, or the like. Typically, the processing procedure of the pattern accumulating portion 204 is realized by software, and the software is stored in a storage medium such as a ROM. Note that the processing procedure also may be realized by hardware (dedicated circuit).

In the conversion word storage portion 205, a conversion word associated with a conversion condition of a character string can be stored. In the conversion word storage portion 205, the conversion condition associated with the conversion word also can be stored. The conversion condition of a character string is a condition such as the arrangement pattern of the character string, the data type, keywords before or after the character string, as described above. The conversion word stored in the conversion word storage portion 205 is managed in association with information indicating the conversion condition. For example, a conversion word and a conversion condition that correspond to each other are managed as two attribute values in one record. The conversion word storage portion 205 is preferably a non-volatile storage medium, but also can be realized as a volatile storage medium.

In the specified information storage portion 206, one or more pieces of specified information, which is information specified by the user or the like in advance, is stored. As described above, the specified information is, for example, information containing a character string, a symbol, or the like specified in advance. The specified information storage portion 206 is preferably a non-volatile storage medium, but also can be realized as a volatile storage medium.

The pattern appearance status accumulating portion 207 accumulates the conversion unit information judged by the comparing portion 203 to match any one piece of the first command pattern information and the first command pattern information judged to match the conversion unit information, in association with each other. The associated information is herein referred to as pattern appearance status information. Furthermore, the pattern appearance status accumulating portion 207 accumulates the conversion unit information judged by the comparing portion 203 to match none of the first command pattern information, and information indicating that there is no match, for example, the information 'no match' or 'else', in association with each other. The accumulation in association with the information is, for example, accumulating the conversion unit information of the first source program and the first command pattern information that match each other, as two attribute values in the same record. For example, a column or the like in which information of, for example, a so-called flag for indicating that there is no match may be provided in a management table or the like for managing the conversion unit information of the first source program, and with respect to the conversion unit information judged to match none of the first command pattern information, information of a flag indicating that there is no match may be stored as a value of this column. That is to say, a flag indicating that there is no match may be set. Alternatively, a flag indicating that there is a match may be set with respect to the conversion unit information that matches the first command pattern information. The same is applied to other embodiments. Herein, a case will be described in which the pattern appearance status accumulating portion 207 accumulates information in the pattern appearance status storage portion 213 described later, but there is no limitation on a portion in which the information is accumulated. This accumulation is a concept that also includes accumulation for temporary storage. The pattern appearance status accumulating portion 207 may be typically realized as an MPU, a memory, or the like. Typically, the processing procedure of the pattern appearance status accumulating portion 207 is realized by software, and the software is stored in a storage medium such as a ROM. Note that the processing procedure also may be realized by hardware (dedicated circuit).

The association pattern accumulating portion 208 accumulates information establishing association with the first command pattern information that matches the conversion unit information, at a position corresponding to the position where the conversion unit information is located in the first source program accepted by the first source program accepting portion 202. The first source program in which the information establishing association with the first command pattern information is accumulated is then accumulated in the association pattern storage portion 214 described later. The information establishing association with the first command pattern information may be accumulated in the first source program, after the first source program is accumulated in advance. For example, with respect to the conversion unit information judged by the comparing portion 203 to match the first command pattern information, the association pattern accumulating portion 208 accumulates the information establishing association with the first command pattern information judged to match the conversion unit information, at a position corresponding to the position where the conversion unit information is located in the first source program. Furthermore, for example, with respect to the conversion unit information judged by the comparing portion 203 to match none of the first command pattern information, the pattern accumulating portion 204 accumulates the comparison command pattern information corresponding to the conversion unit information, as new first command pattern information, in the pattern information storage portion 201. Thus, the association pattern accumulating portion 208 accumulates the information establishing association with the first command pattern information accumulated by the pattern accumulating portion 204, at a position corresponding to the position where the conversion unit information judged to match none of the first command pattern information is located in the first source program. The position corresponding to the position where the conversion unit information is located in the first source program may be any position with which the position where the conversion unit information is located can be specified. Preferable examples thereof include a comment area that is located close to the position where each piece of the conversion unit information is located, and the position immediately before or immediately after each piece of the conversion unit information. The information establishing association with the first command pattern information may be the first command pattern information itself, or may be identification information or the like for identifying the first command pattern information. If, in this manner, the first source program has, for example, identification information of the first command pattern information as the information establishing association with the first command pattern information, at a position corresponding to the position where each piece of the conversion unit information is located, such as a comment area or the like corresponding to each piece of the conversion unit information, and this first source program is accumulated in the association pattern storage portion 214 or the like, to which piece of the first command pattern information each piece of the conversion unit information in the first source program corresponds is specified. For example, in a case where the first source program is automatically converted into the second source program, information that matches the first command pattern information, in the first source program, is converted according to the second command pattern information corresponding to the first command pattern information that matches the information. If the first source program in which information is accumulated by the association pattern accumulating portion 208 is used, to which piece of the first command pattern information each piece of the conversion unit information in the first source program corresponds can be judged. Accordingly, comparison does not have to be performed again to confirm to which piece of the first command pattern information each conversion unit in the first source program corresponds, and thus the process can be performed at a higher speed. In accumulating the first source program in the association pattern storage portion 214, the association pattern accumulating portion 208 may delete or change as appropriate, for example, symbols such as line-feed code of the first source program. The information establishing association with the first command pattern information that matches the conversion unit information is preferably accumulated at a position corresponding to the position where the conversion unit information is located in the first source program accepted by the first source program accepting portion 202. However, for example, in a case where the source program is displayed using a dedicated viewer or the like, as long as the first command pattern information that matches the conversion unit information can be displayed so as to be accumulated at a position corresponding to the position where the conversion unit information is located in the first source program accepted by the first source program accepting portion 202, the first command pattern information may be actually accumulated at a position other than that of the first source program. This accumulation is a concept that also includes accumulation for temporary storage. The association pattern accumulating portion 208 may be typically realized as an MPU, a memory, or the like. Typically, the processing procedure of the association pattern accumulating portion 208 is realized by software, and the software is stored in a storage medium such as a ROM. Note that the processing procedure also may be realized by hardware (dedicated circuit).

The program-based association pattern accumulating portion 209 accumulates information associating the first command pattern information that matches the conversion unit information of the first source program, and the first source program. The information associating the first command pattern information that matches the conversion unit information of the first source program, and the first source program is herein referred to as program-based association pattern information. The program-based association pattern information may be any information, as long as it is displayed which piece of the first command pattern information corresponds to which first source program. The program-based association pattern information may be information directly associating the first command pattern information and the first source program, or may be information indirectly associating them via their identification information or the like. For example, the program-based association pattern accumulating portion 209 accumulates information associating identification information or the like for identifying the first source program accepted by the first source program accepting portion 202 and identification information for identifying the first command pattern information that matches the conversion unit information constituting the first source program, for example, management information or the like having corresponding pieces of identification information as two attribute values in the same record, in the program-based association pattern storage portion 215. If such information establishing association is used, what kind of and how many pieces of first command pattern information exist in each piece of the first source program can be determined, the number of times the first command pattern information appears is counted and analyzed, and thus how to efficiently perform the conversion process of the first source program can be judged. Here, the information associating the first command pattern information and the first source program may contain information indicating the position in which the conversion unit information corresponding to each piece of the first command pattern information is present in the first source program, for example, information indicating the row in which the conversion unit information corresponding to each piece of the first command pattern information is present. This accumulation is a concept that also includes accumulation for temporary storage. The program-based association pattern accumulating portion 209 may be typically realized as an MPU, a memory, or the like. Typically, the processing procedure of the program-based association pattern accumulating portion 209 is realized by software, and the software is stored in a storage medium such as a ROM. Note that the processing procedure also may be realized by hardware (dedicated circuit).

In the user specified word storage portion 211, the above-mentioned user specified word can be stored. The user specified word storage portion 211 is preferably a non-volatile storage medium, but also can be realized as a volatile storage medium.

In the pattern appearance status storage portion 213, the pattern appearance status information can be stored. More specifically, in the pattern appearance status storage portion 213, information associating the conversion unit information judged by the comparing portion 203 to match any one piece of the first command pattern information and the first command pattern information judged to match the conversion unit information can be stored. Furthermore, in the pattern appearance status storage portion 213, information associating the conversion unit information judged by the comparing portion 203 to match none of the first command pattern information and information indicating that there is no match can be stored. The pattern appearance status storage portion 213 is preferably a non-volatile storage medium, but also can be realized as a volatile storage medium.

In the association pattern storage portion 214, the first source program in which information establishing association with the first command pattern information that matches the conversion unit information is accumulated at a position corresponding to the position where the conversion unit information is located can be stored. The association pattern storage portion 214 is preferably a non-volatile storage medium, but also can be realized as a volatile storage medium.

In the program-based association pattern storage portion 215, the program-based association pattern information can be stored. The program-based association pattern storage portion 215 is preferably a non-volatile storage medium, but also can be realized as a volatile storage medium.

The output portion 216 outputs information accumulated by the pattern accumulating portion 204, the pattern appearance status accumulating portion 207, the association pattern accumulating portion 208, the program-based association pattern accumulating portion 209, and the like. More specifically, the information stored in the pattern information storage portion 201, the pattern appearance status storage portion 213, the association pattern storage portion 214, the program-based association pattern storage portion 215, and the like is read and output as appropriate according to an instruction from the user or the like. The output portion 216 may perform a process such as counting on the information accumulated by the program-based association pattern accumulating portion 209, and output information obtained as the result. This output is a concept that includes displaying on a display screen, printing by a printer on paper or the like, accumulation in a storage medium or the like, transmission to an external device, and the like. The output portion 216 may be considered to include or not to include an output device such as a display screen or a printer. The output portion 216 may be realized as driver software for an output device, or a combination of driver software for an output device and the output device. Furthermore, the output portion 216 may include an MPU, a memory, or the like for performing counting and the like.

Next, an example of the operation of the program pattern analyzing apparatus will be described with reference to the flowchart in FIG. 9.

(step S901) The first source program accepting portion 202 accepts a first source program. The first source program is, for example, program that is to be converted and that is to be analyzed. For example, if the first source program is stored in a memory or the like, the first source program accepting portion 202 may accept the first source program by reading it from the memory or the like. The accepted first source program is temporarily stored in a memory (not shown) or the like.

(step S902) The association pattern accumulating portion 208 accumulates the first source program accepted in step S901 in the association pattern storage portion 214.

(step S903) The comparing portion 203 substitutes 1 for a counter k. This counter k is a program counter of the first source program accepted in step S901.

(step S904) The acquiring unit 20301 of the comparing portion 203 reads the $k^{th}$ conversion unit information from the first source program accepted in step S901. As a specific example, a character string determined according to a given rule, for example, character string delimited by spaces or the like (i.e., a so-called word) is sequentially read from the position where the conversion unit information was read last time (if k=1, from the first position in the first source program) in the first source program, and it is sequentially judged whether or not the read character string matches any one piece of the specified information, which is a character string stored in the specified information storage portion 206. The process is repeated after a character string that matches the specified information is read until the next character string that matches the specified information is read, and information from the former matching character string to a position immediately before the next matching character string is read as the $k^{th}$ conversion unit information. If the conversion unit information is read according to this rule, the first character string at the reading start position of the conversion unit information is considered to match the specified information, and information from the reading start position to a position immediately before a character string that matches the next specified information may be fetched without performing comparison between the first character string and the specified information.

(step S905) The comparing portion 203 compares the $k^{th}$ conversion unit information fetched in step S904 with the first command pattern information accumulated in the pattern information storage portion 201. This comparison process will be described later in detail.

(step S906) The pattern accumulating portion 204 judges whether or not the result is obtained that the $k^{th}$ conversion unit information matches any one piece of the first command pattern information stored in the pattern information storage portion 201, as a result of the comparison in step S905. If the result is obtained that the $k^{th}$ conversion unit information matches any one piece of the first command pattern information, the procedure proceeds to step S908. If the result is obtained that the $k^{th}$ conversion unit information matches none of the first command pattern information, the procedure proceeds to step S907.

(step S907) The pattern accumulating portion 204 accumulates the comparison command pattern information corresponding to the $k^{th}$ conversion unit information, as the first command pattern information, in the pattern information storage portion 201. As described later, the comparing portion 203 compares the comparison command pattern information constructed from the $k^{th}$ conversion unit information with the first command pattern information, and thus the comparison command pattern information is accumulated in the pattern information storage portion 201.

(step S908) The pattern appearance status accumulating portion 207 accumulates the pattern appearance status information according to a result of the judgment in step S906, in the pattern appearance status storage portion 213. For example, if the result is obtained in step S906 that the $k^{th}$ conversion unit information matches the first command pattern information, the pattern appearance status information associating the first command pattern information and the $k^{th}$ conversion unit information that match each other is accumulated. If the result is obtained in step S906 that the $k^{th}$ conversion unit information matches none of the first command pattern information, the pattern appearance status information associating information indicating that there is no match and the $k^{th}$ conversion unit information is accumulated. If the process in step S907 is performed, the process in step S908 does not have to be performed. If the process in step S907 is performed, the process in step S908 may be omitted.

(step S909) The association pattern accumulating portion 208 accumulates information indicating the first command pattern information that matches the $k^{th}$ conversion unit information, at a position indicating the position where the conversion unit information is located in the first source program accumulated in the association pattern storage portion 214 in step S902. For example, the association pattern accumulating portion 208 accumulates information for identifying the first command pattern information judged in the process in step S905 to match the $k^{th}$ conversion unit information, or information for identifying the first command pattern information newly registered in step S907, in a comment area associated with the conversion unit information in the first source program.

(step S910) The program-based association pattern accumulating portion 209 accumulates the program-based association pattern information, in the program-based association pattern storage portion 215.

(step S911) The comparing portion 203 increments the counter k by 1.

(step S912) The acquiring unit 20301 of the comparing portion 203 judges whether or not the $k^{th}$ conversion unit information is present in the first source program. If the $k^{th}$ conversion unit information is present, the procedure returns to step S904. If the $k^{th}$ conversion unit information is not present, the procedure proceeds to step S913. For example, if the last information in the first source program is fetched as the conversion unit information in the last process in step S904, it is judged that the k$^{th}$ conversion unit information is not present.

(step S913) The output portion 216 judges whether or not there is an instruction to output information accumulated by the pattern accumulating portion 204, the pattern appearance status accumulating portion 207, the association pattern accumulating portion 208, the program-based association pattern accumulating portion 209, or the like. For example, if an accepting portion (not shown) or the like accepts an instruction to output this information, the output portion 216 judges that there is an output instruction. If there is an output instruction, the procedure proceeds to step S914. If there is no output instruction, the process ends.

(step S914) In step S914, the output portion 216 reads information on which the output instruction has been given, from the pattern information storage portion 201, the pattern appearance status storage portion 213, the association pattern storage portion 214, the program-based association pattern storage portion 215, or the like, and outputs the information. The process ends.

Figure 9:
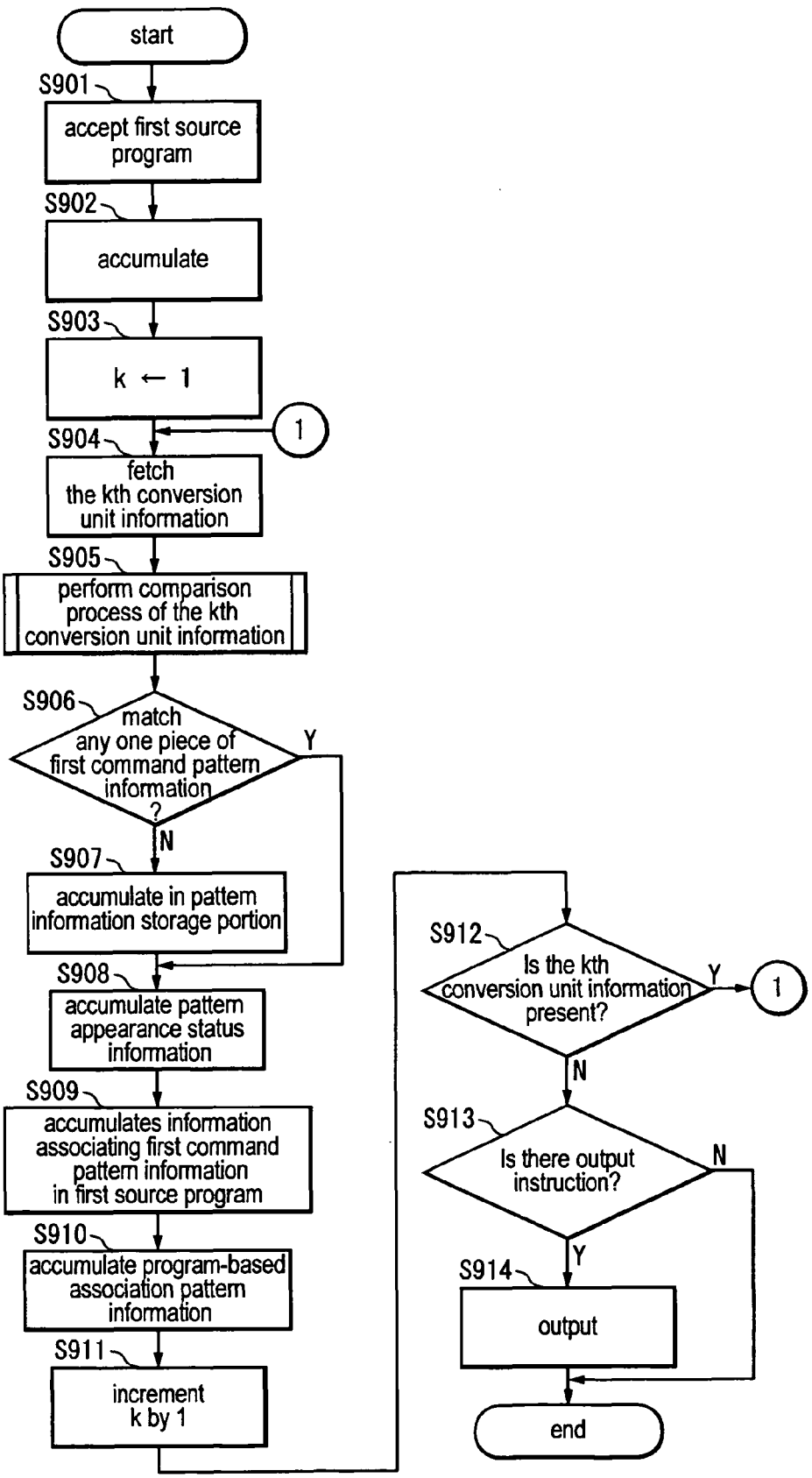
FIG. 9 is a flowchart illustrating an operation of the program pattern analyzing apparatus in this embodiment.

In step S904 in the flowchart in FIG. 9, in fetching the k$^{th}$ conversion unit information, the k$^{th}$ conversion unit information is detected from the first source program. The first source program may be modified in advance so that the conversion unit information can be easily read, by detecting all pieces of the conversion unit information in the first source program through a process similar to that described above, deleting or replacing as appropriate, for example, information of line-feed code or spaces in all pieces of the conversion unit information, thereby, for example, forming information in which one piece of the conversion unit information corresponds to information in one row. In this case, in order to read the k$^{th}$ conversion unit information in the process in step S904, information in the k$^{th}$ row may be read.

Note that the process is ended by powering off or interruption for aborting the process in the flowchart in FIG. 9.

Next, the process in step S905 in FIG. 9 will be described in detail with reference to the flowchart in FIG. 10.

(step S1001) The command pattern constructing unit 20302 constructs the comparison command pattern information according to k$^{th}$ conversion unit information. As a specific example, words contained in the conversion unit information are sequentially fetched, and it is judged whether or not the words match any one piece of the specified information stored in the specified information storage portion 206 and the user specified word stored in the user specified word storage portion. The words that match any one of them are not converted and left as they are. Furthermore, it is judged whether or not the words that match none of them match the conversion conditions stored in the conversion word storage portion 205. If the words match the conversion conditions, the words are replaced by conversion words associated with the conversion conditions. The other words are left as they are. The comparison command pattern information according to the k$^{th}$ conversion unit information is constructed by performing replacement of the words in the k$^{th}$ conversion unit information as appropriate in this manner.

(step S1002) The pattern comparing unit 20303 substitutes 1 for a counter l.

(step S1003) The pattern comparing unit 20303 reads the l$^{th}$ first command pattern information, from the pattern information storage portion 201.

(step S1004) The pattern comparing unit 20303 compares the l$^{th}$ first command pattern information with the comparison command pattern information constructed in step S1001.

(step S1005) The pattern comparing unit 20303 judges whether or not the l$^{th}$ first command pattern information and the comparison command pattern information constructed in step S1001 match each other. If they match each other, the procedure proceeds to step S1006. If they do not match each other, the procedure proceeds to step S1007.

(step S1006) The pattern comparing unit 20303 outputs the information indicating that the k$^{th}$ conversion unit information matches the l$^{th}$ first command pattern information, to the upper-level function. The procedure returns to the upper-level function.

(step S1007) The pattern comparing unit 20303 increments the counter l by 1.

(step S1008) The pattern comparing unit 20303 judges whether or not the l$^{th}$ first command pattern information is present in the pattern information storage portion 201. If the l$^{th}$ first command pattern information is present, the procedure returns to step S1003. If the l$^{th}$ first command pattern information is not present, the procedure proceeds to step S1009.

(step S1009) The pattern comparing unit 20303 outputs the information indicating that there is no matching first command pattern information, to the upper-level function. The procedure returns to the upper-level function.

Figure 10:
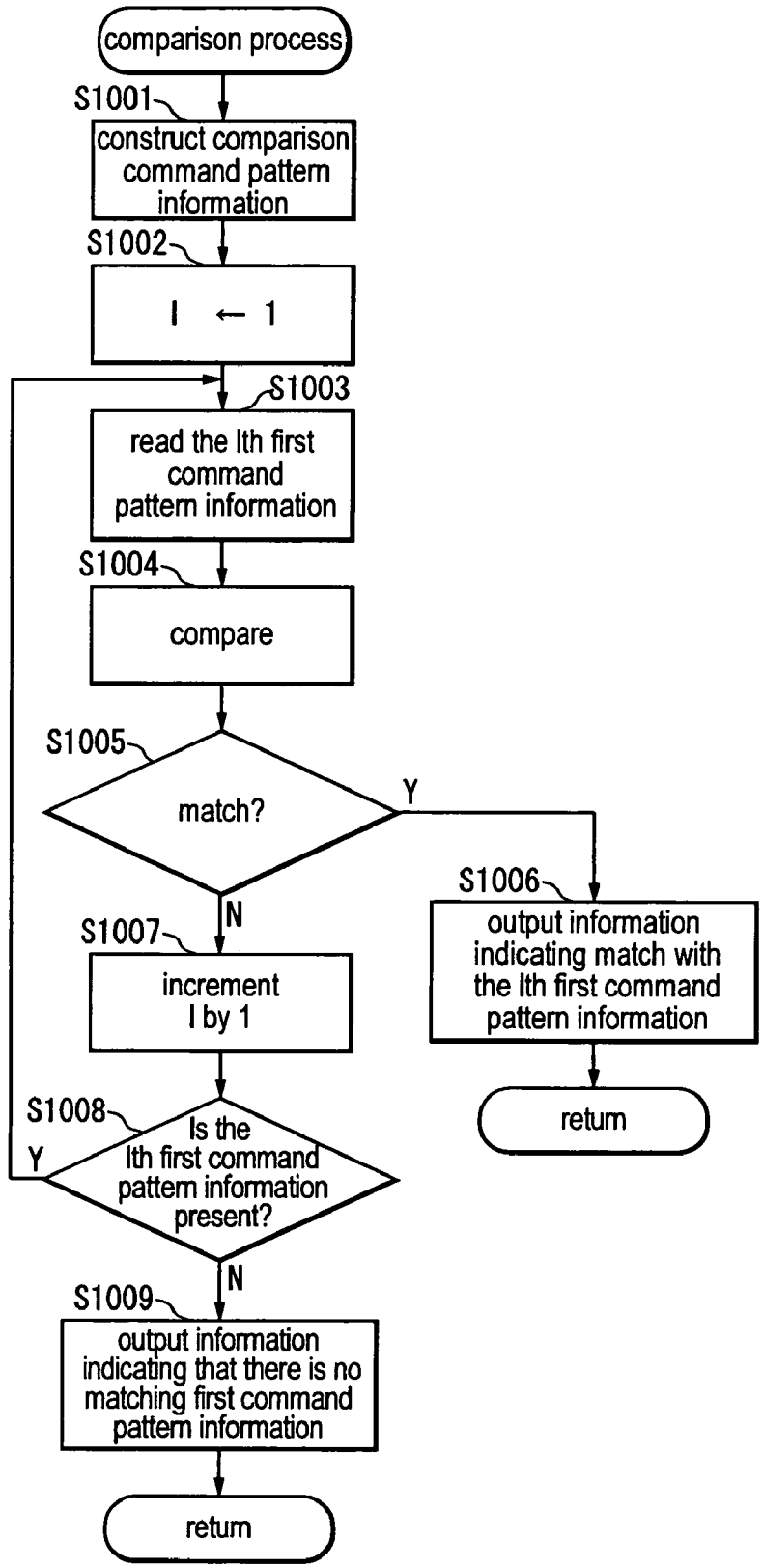
FIG. 10 is a flowchart illustrating an operation of the program pattern analyzing apparatus in this embodiment.

Note that the process is ended by powering off or interruption for aborting the process in the flowchart in FIG. 10.

Hereinafter, a specific operation of the program pattern analyzing apparatus in this embodiment will be described. COBOL language is used as an example in the programs, the source code, and the like used in the specific example, but this is prepared for the sake of explanation, and may be partially different from actually used languages.

FIG. 11 is a command pattern information management table stored in the pattern information storage portion 201. In the command pattern information management table, multiple records having the attributes 'ID' and 'first command pattern' are stored. 'ID' refers to information for identifying a record, and is information used for managing the table. 'First command pattern' refers to first command pattern information. The first command pattern information is represented by English letters, numeric characters, Italic type letters, and symbols such as spaces. The portions represented by Italic type letters indicate unfixed information, which is information such as a variable, a function name, or a literal character in which the user or the like can specify a value, a character string, or the like. The other portions indicate fixed information, which is the information other than unfixed the information.

FIG. 12 is an example of a first source program accepted by the first source program accepting portion 202. Herein, a case will be described in which the program pattern analyzing apparatus accepts a first source program as shown in FIG. 12 and starts an analysis in response to an instruction from the user. Comment rows and the like are omitted in the program in FIG. 12, but if a comment row is contained, the comment row and the like may be deleted in advance from the source program accepted by the first source program accepting portion 202. In the source program in FIG. 12, a portion that contains multiple successive space symbols may be subjected, for example, a process in which the multiple successive space rows are deleted from the source program accepted by the first source program accepting portion 202 so that only one space row is left. In the source program in FIG. 12, a portion that contains control symbols such as line-feed code may be subjected, for example, a process in which the control symbols such as line-feed code are deleted from the source program accepted by the first source program accepting portion 202. Furthermore, for example, control symbols such as comment rows or line-feed code may not be analyzed in the processes after the source program is accepted, that is, the control symbols may be ignored. Furthermore, for example, two or more successive spaces may be treated as one space.

FIG. 13 is a specified information management table for managing the specified information stored in the specified information storage portion 206. The specified information management table has the attributes 'ID' and 'specified information'. 'ID' refers to information for identifying a record, and is information used for managing the table. 'Specified information' refers to specified information. Herein, a case will be described as an example in which the specified information is multiple command words specified by the user among command words that can be used in the first source program.

First, in response to an instruction or the like from the user, the first source program accepting portion 202 reads a first source program as shown in FIG. 12 from a hard disk or the like, and accepts the first source program. The accepted first source program is temporarily stored in a memory (not shown) or the like.

Furthermore, the association pattern accumulating portion 208 accumulates the accepted first source program in the association pattern storage portion 214.

Next, the acquiring unit 20301 of the comparing portion 203 fetches conversion unit information from the first source program. More specifically, the acquiring unit 20301 fetches conversion unit information according to a prespecified rule for fetching conversion unit information. As a specific example, it is assumed that the rule for fetching conversion unit information is a rule in which information from a character string following the appearance of a period in the specified information stored in the specified information storage portion 206 to a position immediately before the next appearance of the specified information, in the first source program, and information from the appearance of information other than a period in the specified information stored in the specified information storage portion 206 to a position immediately before the next appearance of the specified information, in the first source program, are fetched. Herein, the specified information is a character string specified by the user, for example, a character string including command words such as 'MOVE' or 'CALL' and periods. The command words are considered to include 'IF', 'ELSE', and the like. It is assumed that, for example, comparison with the specified information and the like is performed in the unit of a character string delimited by spaces or periods, that is, a word. Furthermore, line-feed code and the like may be ignored in this fetching process, or converted into spaces or the like in converting the information. Furthermore, two or more successive spaces and the like may be deleted so that only one space is left. Prior to this fetching process, as described above, a process or the like in which line-feed code and the like are converted into spaces may be performed on the first source program. The acquiring unit 20301 performs the process of fetching the conversion unit information according to this rule, for example, by executing a program or the like. This program may be stored in advance in a memory (not shown) or the like.

For example, according to this sort of rule, the acquiring unit 20301 fetches the conversion unit information as indicated by the dotted line in FIG. 14, sequentially from the beginning of the first source program.

Next, the command pattern constructing unit 20302 converts the conversion unit information fetched by the acquiring unit 20301 into comparison command pattern information. In this specific example, pieces of the conversion unit information fetched by the acquiring unit 20301 are sequentially changed into comparison command pattern information. The changing process into the comparison command pattern information will be described using an example in which conversion unit information 1401 shown in FIG. 14 is converted into comparison command pattern information.

FIG. 15 is a user specified word management table for managing the user specified words stored in the user specified word storage portion 211. The user specified word management table has the attributes 'ID' and 'user specified word'. 'ID' refers to information for identifying a record, and is information used for managing the table. 'User specified word' refers to a user specified word. 'User specified word' refers to information specifying a character string that is not to be replaced by a conversion word, in the first source program.

FIG. 16 is a conversion word management table for managing the conversion words stored in the conversion word storage portion 205 and conversion rules associated with the conversion words. The conversion word management table has the attributes 'ID', 'conversion condition', and 'conversion word'. 'ID' refers to information for identifying a record, and is information used for managing the table. 'Conversion condition' is information indicating a condition or rule for determining a character string that is to be converted into a conversion word. 'Conversion word' refers to a character string by which a character string that matches 'conversion condition' is to be replaced. 'Conversion condition' is a combination of a clue character string functioning as a key in the search and information indicating the position of a character string that is to be converted, relative to the clue character string. The clue character string and the information indicating the position are separated with ','. Herein, if the clue character string itself is a character string that is to be converted, ',' and the information indicating the position are omitted. The clue character string may be any information, as long as it can be used as a search key for the character string, and also may be information specifying a specific character string, the attribute of a character string, or the length of a character string. The information indicating the position is represented as information indicating the position such as 'before' or 'after' relative to the clue character string. For example, if the unit of one character string is considered as a group of characters delimited by control symbols such as spaces, periods, or line-feed code, conversion in a case where the conversion condition 'PROGRAM-ID, after' whose 'ID' is 'R001' refers to conversion in which a character string delimited by spaces immediately after the character string 'PROGRAM-ID' in the conversion unit information is converted into the character string 'PROGRAM NAME' that is 'conversion word' in the same record. Conversion indicated by the conversion condition in 'R004' refers to conversion in which a literal character in the conversion unit information is retrieved and the retrieved literal character is converted into the character string 'CHARACTER CONSTANT'. Herein, it is assumed that a character string enclosed by '" "' is defined to be a literal character in advance. 'Conversion condition' may be actually associated, for example, with a conditional expression or the like for judging the conversion condition, and whether or not the condition is satisfied may be judged according to whether or not the conditional expression or the like is satisfied by the character string in the conversion unit information. If two or more conversion conditions are satisfied, which conversion condition is to be prioritized may be specified in advance for each conversion condition, or may be specified according to the order of the 'ID' number. A condition for performing an exceptional process may be specified for the conversion condition. For example, whether or not to enable a given conversion condition may be changed according to the conversion unit information that appears immediately before.

First, the command pattern constructing unit 20302 sequentially fetches character strings delimited by spaces in the conversion unit information from the beginning of the conversion unit information, and judges whether or not each character string matches any one piece of the specified information stored in the specified information storage portion 206 as shown in FIG. 13. If the character string matches any one piece of the specified information, the character string is determined as a character string that is not to be converted and left as it is. If the character string matches none of the specified information, it is judged whether or not the character string matches any one of the user specified words stored in the user specified word storage portion 211 as shown in FIG. 15. If the character string matches any one of the user specified words, the character string is determined as a character string that is not to be converted and left as it is. If the character string matches none of the user specified words, the character string is judged to be a character string that can be converted. Next, among the character strings that can be converted in the conversion unit information, character strings that satisfy the conversion conditions as shown in FIG. 16 are replaced by conversion words that are character strings associated with the conversion conditions. Among the character strings that can be converted, character strings that do not satisfy the conversion conditions are left as they are. Accordingly, the comparison command pattern information can be constructed, by converting only character strings other than the user specified words into conversion words, among character strings that satisfy the conversion conditions associated with the conversion words in the conversion unit information.

Herein, the order and the like of the procedure of this conversion process can be changed, as long as the same processing result is obtained.

For example, a description will be given using 'CALL "AAA" USING AAA I0X-PCB 100.', which is the conversion unit information 1401 in FIG. 14, as an example.

'CALL' matches 'specified information' whose 'ID' is 'C5004' in the specified information management table in FIG. 13, and thus 'CALL' is judged to be the specified information and left as it is without conversion as a character string that is not to be converted.

'"AAA"', which appears next, matches neither the specified information nor the user specified word, and thus '"AAA"' is judged to be a character string that can be converted. This character string is literal characters enclosed by and thus the character string is judged to match '"literal character"' that is 'conversion condition' whose 'ID' is 'R004' in the conversion word management table shown in FIG. 16, and replaced by '"CHARACTER CONSTANT"' that is 'conversion word' in the same record.

'USING' matches neither the specified information nor the user specified word and satisfies no 'conversion condition' managed in the conversion word management table, and thus 'USING' is left as it is without replacement.

'AAA' matches neither the specified information nor the user specified word, and thus 'AAA' is judged to be a character string that can be converted. This character string matches 'AAA' that is 'conversion condition' whose 'ID' is 'R007' in the conversion word management table shown in FIG. 16, and thus the character string is judged to be a character string that matches the conversion condition, and replaced by 'NUMERIC CHARACTER ITEM' that is 'conversion word' in the same record.

'I0X-PCB' does not match the specified information, but matches the user specified word whose 'ID' is 'U0001' in the user specified word management table in FIG. 15, and thus 'I0X-PCB' is judged to be the user specified word and left without conversion as a character string that is not to be converted.

'100' matches neither the specified information nor the user specified word, and thus this character string is judged to be a character string that can be converted. This character string is numeric characters, and thus the character string is judged to be a character string that matches 'numeric character' that is 'conversion condition' whose 'ID' is 'R005' in the conversion word management table shown in FIG. 16, and replaced by 'NUMBER' that is 'conversion word' in the same record.

As a result of the conversion performed as appropriate as described above, the comparison command pattern information 'CALL "CHARACTER CONSTANT" USING NUMERIC CHARACTER ITEM I0X-PCB NUMBER' is constructed from the conversion unit information 1401.

Next, the pattern comparing unit 20303 judges whether or not the comparison command pattern information constructed by the command pattern constructing unit 20302 matches any one piece of the first command pattern information stored in the pattern information storage portion 201 as shown in FIG. 11. The comparison between the comparison command pattern information and the first command pattern information is typically based on whether or not they fully match each other. Herein, for example, control code such as spaces and line-feed code may be ignored in the judgment of whether or not they match each other. The comparison of pattern information is known, for example, in techniques for comparing character strings, and thus a description thereof is omitted.

It is assumed that 'CALL "CHARACTER CONSTANT" USING NUMERIC CHARACTER ITEM I0X-PCB NUMBER' that is the comparison command pattern information is judged to match none of the first command pattern information. In this case, the pattern accumulating portion 204 accumulates the comparison command pattern information that matches none of the first command pattern information, as new first command pattern information, in the pattern information storage portion 201. For example, this new first command pattern information is accumulated as first command pattern information whose 'ID' is 'P800100'. A display example of the newly accumulated first command pattern information will be described later.

Furthermore, the association pattern accumulating portion 208 acquires identification information that is an attribute value of 'ID' of the first command pattern information shown in FIG. 11, and that is newly provided to the first command pattern information newly added to the pattern information storage portion 201, and accumulates 'P800100' that is the identification information of the newly added first command pattern information, at a position corresponding to the position where the conversion unit information from which the newly added first command pattern information is constructed is located in the first source program stored in the association pattern storage portion 214, herein, in a comment area or the like located in the row of the source program in which the conversion unit information is located. For example, in some program languages such as COBOL, the area in a specified column and its following columns in each row can be used as a comment area. Furthermore, typically, multiple pieces of conversion unit information are not arranged in one row. Thus, if 'P800100' that is 'ID' of the first command pattern information is stored in the comment area in the row in which the conversion unit information is located, 'first command pattern information' corresponding to each piece of the conversion unit information can be promptly detected.

FIG. 17 shows an example of the first source program stored in the association pattern storage portion 214, in which the information establishing association with the first command pattern information is accumulated. Herein, an example is shown in which an area between the 70$^{th}$ column to the 80$^{th}$ column is used as a comment area 1701.

Furthermore, the program-based association pattern accumulating portion 209 accumulates the program-based association pattern information, which is information associating 'P800100' that is the identification information of the newly added first command pattern information and the identification information of the first source program that is being analyzed, in the program-based association pattern storage portion 215. It is assumed that the identification information of the first source program that is being analyzed is, for example, 'PGID001'. Furthermore, it is assumed that in the program-based association pattern information, the identification information of the newly added first command pattern information, and the row number (if the conversion unit information are described over multiple rows, the row number of a row representing the multiple rows, such as the first row) in the first source program in which the conversion unit information from which the added first command pattern information is constructed is located, are accumulated in association with each other.

FIG. 18 shows an example of the program-based association pattern information. The program-based association pattern information has the attributes 'source ID', 'pattern ID', and 'row'. 'Source ID' refers to the identification information of the first source program that is being analyzed. 'Pattern ID' refers to the identification information of the newly added first command pattern information, that is, the identification information of the first command pattern information judged to be contained in the first source program. 'Row' refers to the row number of a row in which the conversion unit information from which the newly added first command pattern information is constructed is located, that is, the row number of a row in which the conversion unit information corresponding to the first command pattern information is located in the first source program.

Furthermore, the pattern appearance status accumulating portion 207 acquires the conversion unit information from which the comparison command pattern information judged to match none of the first command pattern information is constructed, and accumulates pattern appearance status information associating the conversion unit information and information indicating that there is no first command pattern information corresponding to the conversion unit information, herein, the character string 'else', in the pattern appearance status storage portion 213. Furthermore, information indicating the position where the conversion unit information appears is accumulated in association with these pieces of information. A display example of the pattern appearance status information will be described later.

If the comparison command pattern information is judged to match any one piece of the first command pattern information, the pattern accumulating portion 204 does not accumulate the comparison command pattern information. For example, it is assumed that 'PROGRAM-ID VARIABLE' is obtained as the comparison command pattern information. In this case, as shown in the command pattern information management table in FIG. 11, the first command pattern information 'PROGRAM-ID VARIABLE' is already stored as the first command pattern information whose 'ID' is 'P800001' in the pattern information storage portion 201, and thus it is judged that the first command pattern and the comparison command pattern information match each other. Thus, the comparison command pattern information is not accumulated again in the pattern information storage portion 201.

Furthermore, the association pattern accumulating portion 208 acquires the identification information of the first command pattern information judged to match the comparison command pattern information, for example, 'P800001' described above that is 'ID' of the first command pattern information that matches the comparison command pattern information, and accumulates the identification information in a comment area or the like located in the row in which the conversion unit information from which the comparison command pattern information judged to match the first command pattern information is constructed is located, in the first source program stored in the association pattern storage portion 214.

Furthermore, the program-based association pattern accumulating portion 209 accumulates the program-based association pattern information, which is information associating the identification information of the first command pattern information that matches the comparison command pattern information, the row number of a row in the first source program in which the conversion unit information from which the comparison command pattern information that matches the first command pattern information is constructed is located, and 'P800001' that is the identification information of the first source program that is being analyzed, in the program-based association pattern storage portion 215.

Furthermore, the pattern appearance status accumulating portion 207 acquires the conversion unit information from which the comparison command pattern information judged to match the first command pattern information is constructed, from the first source program, and accumulates the pattern appearance status information associating the conversion unit information and the first command pattern information judged to match the comparison command pattern information, in the pattern appearance status storage portion 213. For example, if the conversion unit information from which the comparison command pattern information judged to match the first command pattern information is constructed is 'PROGRAM-ID PGID001', the pattern appearance status accumulating portion 207 accumulates the pattern appearance status information associating the conversion unit information and the first command pattern information 'PROGRAM-ID VARIABLE' judged to match the comparison command pattern information, in the pattern appearance status storage portion 213.

This process is repeatedly performed for each piece of the conversion unit information of the first source program, and the process ends if the process on all pieces of the conversion unit information in the first source program is completed.

Furthermore, if there is an instruction from the user or the like to output at least one piece of the information accumulated by the pattern accumulating portion 204, the pattern appearance status accumulating portion 207, the association pattern accumulating portion 208, the program-based association pattern accumulating portion 209, and the like, the information stored in the pattern information storage portion 201, the pattern appearance status storage portion 213, the association pattern storage portion 214, the program-based association pattern storage portion 215, or the like may be read and output using a monitor or a printer.

FIG. 19 shows a display example in which the pattern information stored in the pattern information storage portion 201, including the first command pattern information newly accumulated by the pattern accumulating portion 204, is displayed on a monitor (not shown). In FIG. 19, for example, information whose 'ID' is 'P800100' is the newly added first command pattern information.

FIG. 20 shows a display example of the pattern appearance status information accumulated in the pattern appearance status storage portion 213. The pattern appearance status information is managed as information having the attributes 'row', 'conversion unit information', and 'first command pattern information', and is displayed as a list as shown in FIG. 20.

Herein, a counting portion (not shown) may be provided in the program pattern analyzing apparatus 10 of this embodiment, and, if necessary, the counting portion may count the number of times the same first command pattern appears or the like using the pattern appearance status information or the program-based association pattern information, and the output portion 216 may output the counting result. For example, based on the pattern appearance status information as shown in FIG. 20, only records whose 'first command pattern information' is 'else' may be extracted as a list and output.

In the pattern appearance status information or the like as shown in FIG. 20, if there is no match, the information 'else' is stored as a value of 'first command pattern information'. However, in the foregoing embodiments, one column in which information such as a so-called flag indicating that the conversion unit information matches none of the first command pattern information is to be stored may be provided in the pattern appearance status information, its management table, or the like, and if the comparing portion 203 judges that a piece of the conversion unit information matches none of the first command pattern information, a flag indicating information such as '1' for indicating that there is no match may be set as a value of the column for indicating that this conversion unit information matches none of the first command pattern information, and the column for the first command pattern information may be left blank.

Hereinafter, another example in which the command pattern constructing unit 20302 converts the conversion unit information into the comparison command pattern information will be described.

Figure 21:
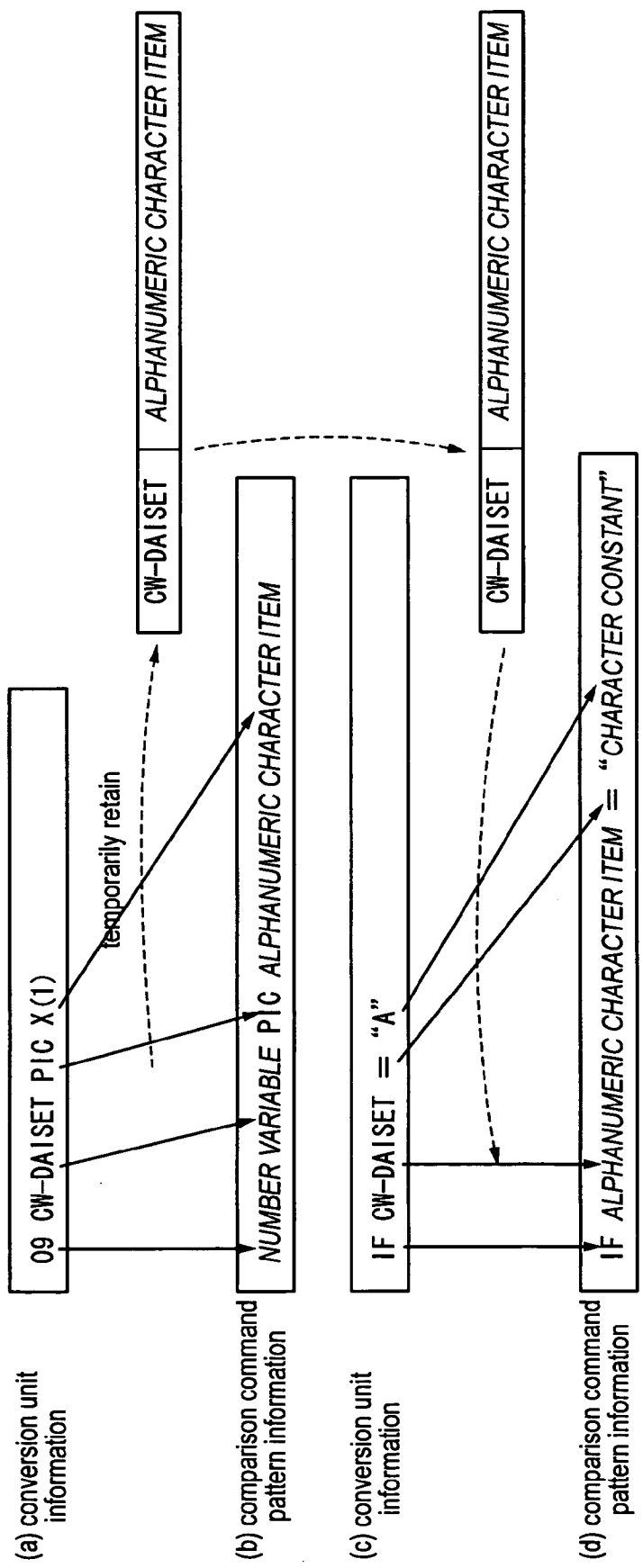
FIG. 21 is a diagram for illustrating an example of a conversion process to obtain comparison command pattern information in this embodiment.

First, it is assumed that as shown in FIG. 21(a), the acquiring unit 20301 fetches the conversion unit information '09 CW-DAISET PIC X(1)', from the first source program.

The command pattern constructing unit 20302 constructs the comparison command pattern information, by performing conversion or the like as appropriate on this conversion unit information as described above. It is assumed that 'PIC' is the user specified word, and that the other character strings in the conversion unit information is neither the specified information nor the user specified word.

First, the command pattern constructing unit 20302 converts the first character string '09' into the character string 'NUMBER' that matches the conversion condition 'numeric character', because this character string is numeric characters and matches the conversion condition 'numeric character' in the conversion word management table.

Next, the command pattern constructing unit 20302 judges that the character string 'CW-DAISET' immediately after the character string converted into 'NUMBER' matches the conversion condition 'NUMBER,after', meaning 'a character string immediately after the character string NUMBER', in the conversion word management table, and converts 'CW-DAISET' into the character string 'VARIABLE' associated with this conversion condition.

Next, the command pattern constructing unit 20302 leaves the character string 'PIC' as it is, because this character string is the user specified word.

Furthermore, the character string 'X(1)' immediately after the character string 'PIC' is judged to match the conversion condition 'PIC,after', meaning 'a character string immediately after the character string PIC' in the conversion word management table, and converted into the character string 'ALPHANUMERIC CHARACTER ITEM' associated with this conversion condition. Accordingly, as shown in FIG. 21(b), the conversion unit information '09 CW-DAISET PIC X(1)' is converted into the comparison command pattern information 'NUMBER VARIABLE PIC ALPHANUMERIC CHARACTER ITEM'.

It is assumed that the temporary conversion condition is set that the same character string as the character string immediately before the character string 'PIC' is replaced by 'ALPHANUMERIC CHARACTER ITEM' from the next conversion. In this case, 'CW-DAISET' that is the character string immediately before the character string 'PIC' is temporarily accumulated in a memory or the like as a conversion condition associated with the conversion word 'ALPHANUMERIC CHARACTER ITEM'. This conversion condition is used as one record in the conversion word management table.

Next, it is assumed that as shown in FIG. 21(c), the conversion unit information 'IF CW-DAISET="A"' is fetched. It is assumed that 'IF' is the specified information, and that the other character strings in the conversion unit information is neither the specified information nor the user specified word.

'IF' is one piece of the specified information, and thus the command pattern constructing unit 20302 does not convert 'IF'. 'CW-DAISET' matches the character string 'CW-DAISET' indicating the temporary conversion condition as described above, and thus 'CW-DAISET' is converted into the conversion word 'ALPHANUMERIC CHARACTER ITEM' that matches this conversion condition. It is assumed that this sort of temporary conversion condition is a conversion condition that is judged in priority to the other conversion conditions. If the temporary conversion condition as described above is not set, this character string matches none of the conversion conditions, and thus 'CW-DAISET' is left as it is. '=' is the reserved word, and thus '=' is not converted. '"A"' is judged to be a literal character enclosed by '" "', and is converted into '"CHARACTER CONSTANT"'. FIG. 21(d) shows the comparison command pattern information obtained as a result of this conversion.

Figure 22:
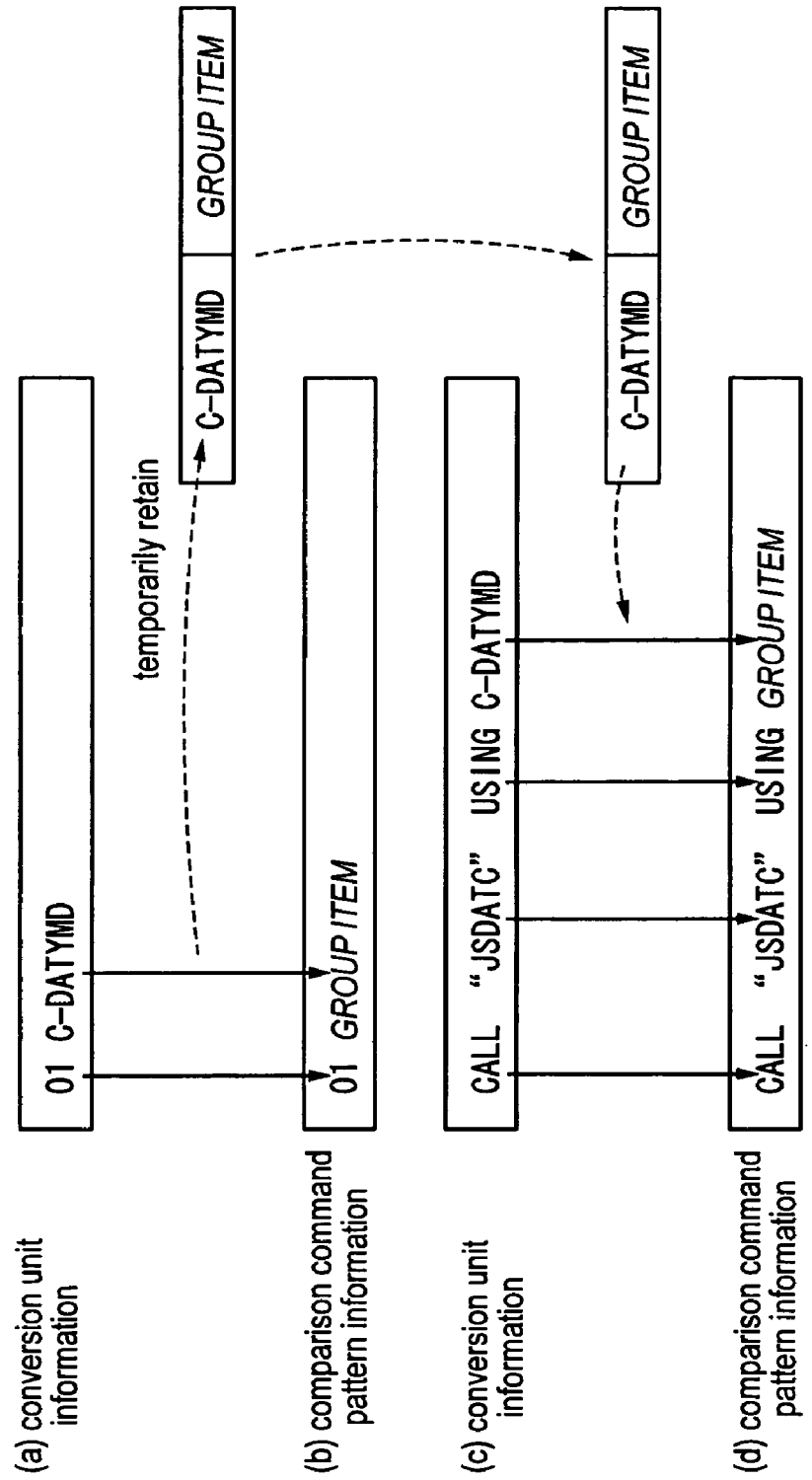
FIG. 22 is a diagram for illustrating an example of a conversion process to obtain comparison command pattern information in this embodiment.

Next, it is assumed that as shown in FIG. 22(a), the acquiring unit 20301 fetches the conversion unit information '01 C-DATYMD', from the first source program.

The command pattern constructing unit 20302 constructs the comparison command pattern information, by performing conversion or the like as appropriate on this conversion unit information as described above. It is assumed that '01' is the user specified word, and that the other character strings in the conversion unit information is neither the specified information nor the user specified word.

The command pattern constructing unit 20302 leaves the first character string '01' as it is without conversion, because this character string is the user specified word.

Next, the command pattern constructing unit 20302 judges that the character string 'C-DATYMD' immediately after '01' is a character string that can be converted, because this character string is neither the specified information nor the user specified word. The command pattern constructing unit 20302 judges that the character string 'C-DATYMD' matches the conversion condition '01,after', meaning 'a character string immediately after the character string 01', in the conversion word management table, and converts 'C-DATYMD' into the character string 'GROUP ITEM' associated with this conversion condition. Accordingly, as shown in FIG. 22(b), the conversion unit information '01 C-DATYMD' is converted into the comparison command pattern information '01 GROUP ITEM'.

It is assumed that the temporary conversion condition is set that the same character string as the character string immediately after the character string '01' is replaced by 'GROUP ITEM' from the next conversion. In this case, 'C-DATYMD' that is the character string immediately after the character string '01' is temporarily accumulated in a memory or the like as a conversion condition associated with the conversion word 'GROUP ITEM'. This conversion condition is used as one record in the conversion word management table.

Next, it is assumed that as shown in FIG. 22(c), the conversion unit information 'CALL "JSDATC" USING C-DATYMD' is fetched. It is assumed that 'CALL' is the specified information, that '"JSDATC"' is the user specified word, and that the other character strings in the conversion unit information is neither the specified information nor the user specified word.

'CALL' is one piece of the specified information, and thus the command pattern constructing unit 20302 does not convert 'CALL'. '"JSDATC"' is one of the user specified words, and thus the command pattern constructing unit 20302 does not convert '"JSDATC"' either. If '"JSDATC"' is not the user specified word, this character string is literal characters, and thus it is converted into '"CHARACTER CONSTANT"'.

'USING' is neither the specified information nor the user specified word and matches no conversion condition associated with the conversion word, and thus 'USING' is left as it is.

'C-DATYMD' matches the character string 'C-DATYMD' indicating the temporary conversion condition, and thus 'C-DATYMD' is converted into the conversion word 'GROUP ITEM' that matches this conversion condition. It is assumed that this sort of temporary conversion condition is a conversion condition that is judged in priority to the other conversion conditions. If the temporary conversion condition as described above is not set, this character string matches none of the conversion conditions, and thus 'C-DATYMD' is left as it is. FIG. 22(d) shows the comparison command pattern information obtained as a result of this conversion.

If conversion conditions temporarily used can be set in this manner according to the appearance status and the like of information that appears in the conversion unit information, for example, a function name or variable name in which a value, a condition, or the like is defined immediately before can be replaced by a conversion word that is different from a conversion word into which another function name or variable name is converted. Thus, convert patterns can be classified and registered in detail so that the convert patterns can be easily used later.

It should be noted that in the foregoing specific example, the comparing portion 203 performs the comparison process and the like each time the acquiring unit 20301 acquires the conversion unit information. However, the acquiring unit 20301 may sequentially acquire pieces of the conversion unit information in advance from the whole or part of the first source program, and convert each piece of the conversion unit information into information in one row or form a database in which each piece of the conversion unit information is in an individual record so that the acquired conversion unit information can be individually fetched.

Furthermore, in the foregoing specific example, an example was described in which the comparison command pattern information is constructed from the conversion unit information, and this comparison command pattern information and the first command pattern information are compared. However, in the present invention, the conversion unit information that has not been changed into the comparison command pattern information, that is, the conversion unit information in which the character strings have not been replaced and the first command pattern information may be compared, the conversion unit information judged to match none of the first command pattern information may be converted into the comparison command pattern information in a similar manner using a method similar to that described above, and then the comparison command pattern information obtained by the conversion may be accumulated as the first command pattern information.

As described above, according to this embodiment, the comparison command pattern information corresponding to the conversion unit information judged to match none of the first command pattern information is accumulated as the first command pattern information, and thus the first command pattern information necessary for converting the first source program is added. As a result, the first command pattern information necessary for automatic conversion and the like can be determined based on the added first command pattern information. Accordingly, for example, how to convert information corresponding to the first command pattern information, in the first source program, can be specified for an automatic conversion apparatus and the like automatically converting a source program, and thus the conversion ratio of the first source program can be improved. Furthermore, based on the newly added first command pattern and the like, the number of steps and the like necessary for the conversion process can be counted, and a conversion plan of whether to perform automatic conversion by specifying the newly added first command pattern as information that is to be automatically converted, or to perform manual conversion or the like can be investigated.

Furthermore, in this embodiment, in particular, the conversion unit information is changed into the comparison command pattern information, and the comparison command pattern information is compared with the first command pattern information. Accordingly, depending on a rule used in changing the conversion unit information into the comparison command pattern information, the comparison with the first command pattern information can be performed also in terms of, for example, the attribute or the data type of non-reserved words such as variables, and thus the comparison can be more precisely performed. As a result, the first command pattern information indicating more detailed conversion conditions can be added, and thus the conversion ratio can be further improved. For example, in contrast to the case in which only the arrangement of reserved words and non-reserved words of the conversion unit information is simply compared, what kind of attribute and the like a non-reserved word such as a variable in the conversion unit information has, what kind of positional relationship the non-reserved word has relative to other command words, or the like is determined, and the non-reserved word can be converted into a conversion word according to the attribute and the like, and information obtained by the conversion can be compared with the first command pattern information. Thus, the conversion unit information and the first command pattern information can be compared in more detail. As a result, the first source program can be more precisely converted. For example, even if there are conversion unit information that contains a numeric character and conversion unit information in which information at the position of the numeric character is replaced by an alphameric character, pieces of the comparison command pattern information constructed from respective pieces of the conversion unit information can be patterns that can be distinguished from each other, for example, by converting the numeric character into the conversion word 'NUMBER' and converting the alphameric character into the conversion word 'VARIABLE ITEM', without simply replacing the numeric character and the alphameric character by a variable.

With respect to the first command pattern information newly accumulated by the pattern accumulating portion 204, information specifying into what kind of command pattern information the first command pattern information corresponding to this first command pattern information to convert may be accepted via an accepting portion (not shown) or the like and accumulated in association with the new first command pattern information in the pattern information storage portion 201. Then, using this accumulated information, source code that matches the first command pattern information stored in the pattern information storage portion 201, in the first source pattern that is to be converted, may be automatically converted according to the pattern corresponding to the first command pattern information. Accordingly, a source program having the same language as that in the first source program can be precisely converted at a high conversion ratio.

Furthermore, according to this embodiment, the conversion unit information that is source code of the first source program judged to match any one of the first command patterns is output in association with the first command pattern judged to match the conversion unit information, and the conversion unit information of the first source program judged to match none of the first command patterns is output in association with the information indicating that there is no match. Thus, what kind of first command pattern appears in which portion in the source program can be judged and confirmed. Accordingly, in converting a source program, for example, what kind of conversion to perform, how many steps are needed for transferring a source program, or what kind of automatic conversion tool and the like to use can be properly determined. As a result, a source program can be efficiently converted. Furthermore, whether or not the correspondence between the conversion unit information in the source program and the first command pattern is properly established can be confirmed. Furthermore, the effect of automatic conversion of a source program using a conversion tool of a source program can be determined.

Furthermore, due to determination of the effect, the pattern analyzing apparatus in this embodiment is effective in a case where an automatic conversion tool is developed, in a case where the number of steps in transferring source code is estimated, and the like.

Furthermore, the pattern analyzing apparatus in this embodiment can be used to determine the standardization status of source code, that is, the quality of the source code. For example, if the number of matching first command patterns is small in source code, it can be judged that standardization of the source code has not been completed.

Furthermore, according to this embodiment, based on the output result of information accumulated by the pattern appearance status accumulating portion 207 and the program-based association pattern accumulating portion 209, source code deviating from coding standardization can be confirmed, and the appearance frequency can be checked. Accordingly, for example, peculiar characteristics of programming performed by a programmer or unique rules and the like in coding can be determined. Thus, a proper conversion method can be selected, and a proper automatic conversion tool can be developed.

Furthermore, in this embodiment, based on information indicating that there is no matching first command pattern, for example, 'else', in the output result of information accumulated by the pattern appearance status accumulating portion 207 and the program-based association pattern accumulating portion 209, source code that has no matching first command pattern or its position can be recognized. Accordingly, based on the source code or its position, it is possible to determine what kind of patterns exist as command patterns other than the first command patterns stored in the pattern information storage portion 201. Thus, for example, command patterns that seem to be preferably registered newly as the first command pattern information can be extracted and added to the first command patterns. Accordingly, the first command pattern information stored in the pattern information storage portion 201 can be optimized according to the source program. In this manner, if an analysis similar to that described above is performed again using the first command pattern information with feedback of the analysis result, the number of pieces of source code that has no matching first command pattern can be reduced, and thus what kind of conversion to perform and the like can be more accurately analyzed.

Furthermore, in this embodiment, the command pattern information stored in the pattern information storage portion 201 is used to analyze a source program, and thus if the command pattern information stored in the pattern information storage portion 201 is changed, source programs can be analyzed in changing various languages of the source programs into other languages. Accordingly, high versatility can be obtained. Furthermore, if the command pattern information is added and updated, the analysis can be more precisely performed.

Furthermore, if the number of times the first command pattern appears in a source program is counted and output using a result obtained by the accumulation performed by the program-based association pattern accumulating portion 209, which first command pattern appears at which frequency can be easily determined. Accordingly, in converting a source program, for example, what kind of conversion to perform, or what kind of automatic conversion tool and the like to use can be properly judged.

It should be noted that in the foregoing specific example, the conversion unit information of the first source program associated with information indicating that there is no match and accumulated in the pattern appearance status storage portion 213 may be read and output by the output portion 216 from the pattern appearance status storage portion 213. As a specific example, among records in the pattern appearance status management table shown in FIG. 20, a record in which a value of the attribute 'first command pattern' is a value indicating that there is no matching first command pattern, for example, 'else' may be read by way of a search or the like, that is, extracted, for example, by the output portion 216, and a table constituted by the extracted records may be output. If such information is used, it is possible to easily determine what kind of patterns exist as command patterns other than the first command patterns initially stored in the pattern information storage portion 201. Thus, extraction of command patterns that seem to be preferably registered newly as the first command patterns, and addition of the extracted command patterns to the first command patterns can be easily and promptly performed.

Furthermore, in the foregoing embodiments, each process (each function) may be realized by integrated processing using a single apparatus (system), or may be realized by distributed processing using multiple apparatuses.

Furthermore, in the foregoing embodiments, it will be appreciated that two or more communication units (information transmitting portions, etc.) in one apparatus may be physically realized as one medium.

Furthermore, in the foregoing embodiments, information related to the process performed by each constituent element, for example, information accepted acquired, selected, generated, transmitted, or received by each constituent element, or information such as a threshold value, a numerical expression, or an address used in by each constituent element in the process may be retained in a storage medium (not shown) temporarily or for a long period of time even if not specified in the description above. Furthermore, information may be accumulated in the storage medium (not shown) by each constituent element or an accumulating portion (not shown). Furthermore, information may be read from the storage medium (not shown) by each constituent element or a reading portion (not shown).

Furthermore, in the foregoing embodiments, the case was described in which the program pattern analyzing apparatus is a stand-alone apparatus, but the program pattern analyzing apparatus may be a stand-alone apparatus, or may be a server apparatus in a server-client system. In the latter case, the output portion outputs a screen, and the accepting portion accepts input, via a communication line.

Furthermore, in the foregoing embodiments, each constituent element may be constituted by dedicated hardware, or alternatively, constituent elements that can be realized by software may be realized by executing a program. For example, each constituent element may be realized by a program execution portion such as a CPU reading out and executing a software program stored in a storage medium such as a hard disk or a semiconductor memory.

Herein, the software that realizes the program pattern analyzing apparatus in the foregoing embodiments may be a following program. Specifically, this program is a program for causing a computer to function as: a pattern information storage portion in which at least one piece of first command pattern information can be stored; a first source program accepting portion that accepts a first source program; a comparing portion that fetches at least one piece of conversion unit information, which is information of a conversion unit functioning as a unit in converting the first source program, from the first source program, and compares each piece of the fetched conversion unit information with at least one piece of the stored first command pattern information, which is information indicating a command pattern of the first source program; and a pattern accumulating portion that accumulates comparison command pattern information that is information indicating a command pattern corresponding to the conversion unit information judged by the comparing portion to match none of the first command pattern information, as the first command pattern information.

Moreover, the software that realizes the program pattern analyzing apparatus of the present invention is a program for causing a computer to function as: a first source program accepting portion that accepts a first source program; a comparing portion that fetches at least one piece of conversion unit information, which is information of a conversion unit functioning as a unit in converting the first source program, from the first source program, and compares each piece of the fetched conversion unit information with at least one piece of the stored first command pattern information, which is information indicating a command pattern of the first source program; and a pattern appearance status accumulating portion that accumulates the conversion unit information judged by the comparing portion to match any one piece of the first command pattern information and the first command pattern information judged to match the conversion unit information, in association with each other, and accumulates the conversion unit information judged by the comparing portion to match none of the first command pattern information and information indicating that there is no match, in association with each other.

In this program, functions realized by the program do not include a function realized only by hardware. For example, a function realized only by hardware such as a modem or an interface card in an acquiring portion that acquires information, an output portion that outputs information, and the like is not included in the functions realized by the program.

Furthermore, the computer that executes this program may be a single computer or multiple computers. More specifically, centralized processing may be performed, or distributed processing may be performed.

Figure 23:
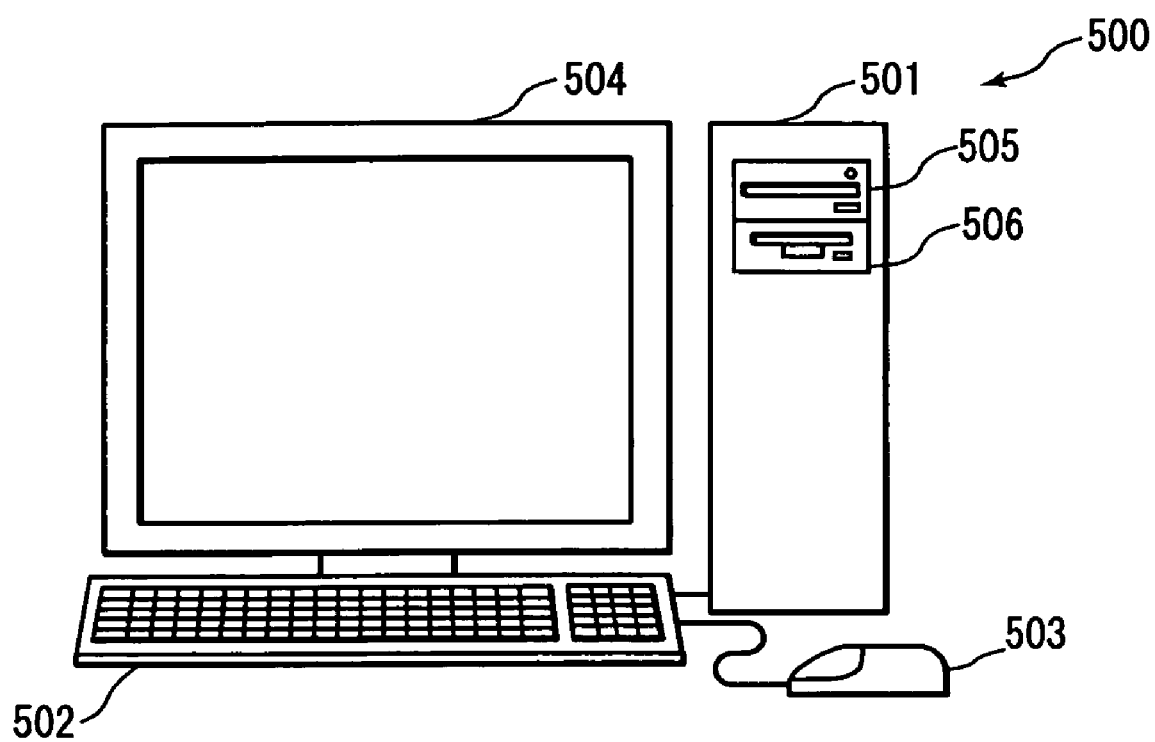
FIG. 23 is a schematic diagram showing an example of the external appearance of a computer system in the embodiments.

FIG. 23 is a schematic diagram showing an example of the external appearance of a computer that executes the above-described program to realize the program pattern analyzing apparatus according to the foregoing embodiments. The foregoing embodiments can be realized by computer hardware and a computer program executed thereon.

In FIG. 23, a computer system 500 includes a computer 501 that includes a CD-ROM (compact disk read only memory) drive 505 and an FD (flexible disk) drive 506, a keyboard 502, a mouse 503, and a monitor 504.

Figure 24:
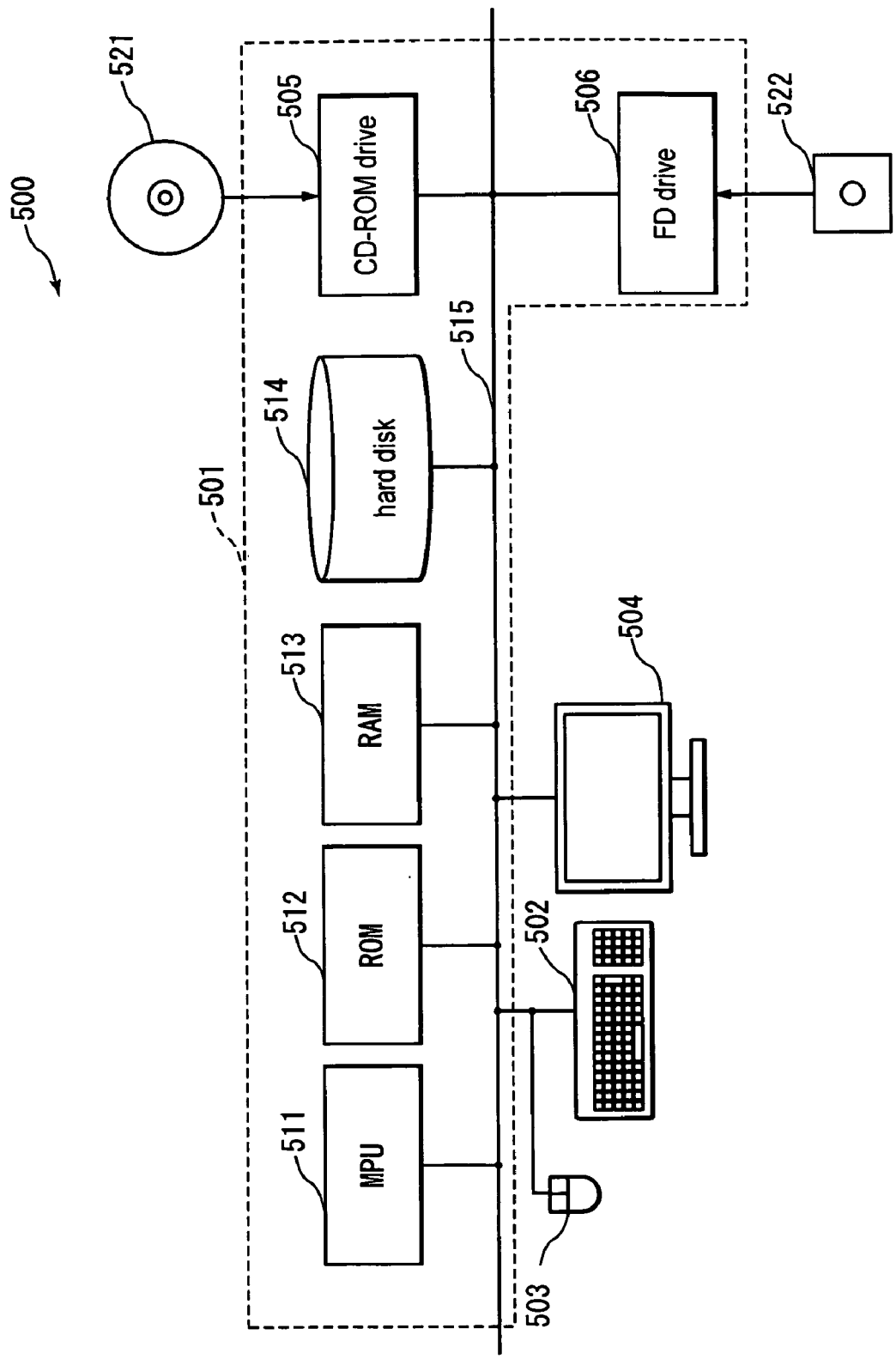
FIG. 24 is a diagram showing an example of the configuration of the computer system in the embodiments.

FIG. 24 is a diagram showing the computer system. In FIG. 24, the computer 501 includes not only the CD-ROM drive 505 and the FD drive 506, but also an MPU (micro processing unit) 511, a ROM (read only memory) 512 in which a program such as a startup program is to be stored, a RAM (random access memory) 513 that is connected to the MPU 511 and in which a command of an application program is temporarily stored and a temporary storage area is provided, a hard disk 514 in which an application program, a system program, and data are stored, and a bus 515 that connects the MPU 511, the ROM 512, and the like. The computer 501 may include a network card (not shown) for providing a connection to a LAN.

The program for causing the computer system 500 to execute the functions of the program pattern analyzing apparatus according to the foregoing embodiments may be stored on a CD-ROM 521 or an FD 522, inserted into the CD-ROM drive 505 or the FD drive 506, and transmitted to the hard disk 514. Alternatively, the program may be transmitted to the computer 501 via a network (not shown) and stored on the hard disk 514. At the time of execution, the program is loaded into the RAM 513. The program may be loaded from the CD-ROM 521 or the FD 522, or directly from a network.

The program does not necessarily have to include, for example, an operating system (OS) or a third party program for causing the computer 501 to execute the functions of the program pattern analyzing apparatus according to the foregoing embodiments. The program may only include a command portion to call an appropriate function (module) in a controlled mode and obtain desired results. The manner in which the computer system 500 operates is well known, and thus a detailed description thereof has been omitted.

The present invention is not limited to the embodiments set forth herein. It will be appreciated that various modifications are possible within the scope of the present invention.

INDUSTRIAL APPLICABILITY

As described above, the program pattern analyzing apparatus and the like according to the present invention is suitable as an apparatus and the like for analyzing a source program, and thus this apparatus and the like are useful, for example, as an apparatus that analyzes the appearance status of a command pattern that needs to be converted, among command patterns contained in a first source program, and improves the conversion ratio of the source program using the analysis result.

The invention claimed is:

1. A pattern information generating method performed using:
   a pattern information storage portion in which at least one piece of first command pattern information, which is information indicating a command pattern of a first source program, can be stored;
   a specified information storage portion in which at least one piece of specified information, which is at least one of a command word and control code specified in advance, can be stored;
   a conversion word storage portion in which a conversion word, which is a character string indicating the type of an unfixed word, among the types of unfixed words including at least one of a variable, a function name and a literal character, and a conversion condition, which is information specifying an unfixed word that is to be converted into the conversion word, can be stored in association with each other;
   a first source program accepting portion; a comparing portion; and
   a pattern accumulating portion,
   the method comprising:
   a first source program accepting step using the first source program accepting portion, of accepting the first source program;
   a comparing step using the comparing portion, of fetching at least one piece of conversion unit information, which is information of a conversion unit functioning as a unit in converting the first source program into a second source program, and representing information in a range from the appearance of one piece of the specified information stored in the specified information storage portion to the next appearance of one piece of the specified information, from the first source program, and comparing each piece of the fetched conversion unit information with the first command pattern information stored in the pattern information storage portion;
   a pattern accumulating step using the pattern accumulating portion, of accumulating comparison command pattern information as new first command pattern information in the pattern information storage portion, the comparison command pattern information being information indicating a command pattern that corresponds to the conversion unit information judged in the comparing step to match none of the first command pattern information, and that is constructed by processing in which among character strings contained in the conversion unit information judged to match none of the first command pattern information, a character string that matches the conversion condition stored in the conversion word storage portion is converted into the conversion word associated with the conversion condition.

2. A tangible non-transitory computer readable medium having a computer program stored therein, the program configuring a computer to execute:
   a first source program accepting portion that accepts a first source program;
   a comparing portion that fetches at least one piece of conversion unit information, which is information of a conversion unit functioning as a unit in converting the first source program into a second source program, and is information in a range from the appearance of one piece of specified information to the next appearance of one piece of the specified information, from the first source program, the specified information being constituted by at least one piece of specified information stored in a specified information storage portion and being at least one of a command word and control code specified in advance, and compares each piece of the fetched conversion unit information with first command pattern information, which is constituted by at least one piece of first command pattern information stored in a pattern information storage portion and is information indicating a command pattern of the first source program; and
   a pattern accumulating portion that accumulates, as new first command pattern information, comparison command pattern information that is information indicating a command pattern that corresponds to the conversion unit information judged by the comparing portion to match none of the first command pattern information, and that is constructed by processing in which among character strings contained in the conversion unit information judged to match none of the first command pattern information, a character string that matches a conversion condition stored in a conversion word storage portion in association with a conversion word is converted into the conversion word associated with the conversion condition, the conversion word being a character string indicating the type of an unfixed word, among the types of unfixed words including at least one of a variable, a function name and a literal character, and the conversion condition being information specifying an unfixed word that is to be converted into the conversion word.

3. The computer readable medium according to claim 2, wherein the specified information is any one of IF, ELSE, COMPUTE, CALL, SET, and MOVE.

4. The computer readable medium according to claim 2,
   wherein the comparing portion compares the conversion unit information as it is with the first command pattern information, and
   if the comparing portion judges that the conversion unit information matches none of the first command pattern information, the pattern accumulating portion uses the conversion unit information to construct the comparison command pattern information corresponding to the conversion unit information, and accumulates the constructed comparison command pattern information as new first command pattern information in the pattern information storage portion.

5. The computer readable medium according to claim 4,
   wherein the conversion condition is a combination of a clue character string, which is information specifying a character string that is to be retrieved, and information indicating the position of a character string that is to be converted, relative to the clue character string, and
   the pattern accumulating portion constructs the comparison command pattern information, by retrieving a character string that matches the clue character string, in the conversion unit information, and converting a character string whose position relative to the character string that matches the clue character string is indicated by the information indicating the position of a character string that is to be converted, into the conversion word associated with the conversion condition containing the clue character string.

6. The computer readable medium according to claim 2,
wherein the comparing portion uses the conversion unit information to construct the comparison command pattern information corresponding to the conversion unit information, and compares the constructed comparison command pattern information with the first command pattern information, and if the comparing portion judges that the comparison command pattern information matches none of the first command pattern information, the pattern accumulating portion accumulates the comparison command pattern information constructed by the comparing portion, as new first command pattern information, in the pattern information storage portion.

7. The computer readable medium according to claim 6, further comprising:
   a user specified word storage portion in which a user specified word, which is a character string specified by a user, can be stored,
   wherein the comparing portion comprises:
   an acquiring unit that fetches the conversion unit information, which is information of a conversion unit functioning as a unit in converting the first source program, from the first source program;
   a command pattern constructing unit that constructs the comparison command pattern information, by converting a character string that is not the user specified word stored in the user specified word storage portion and that matches the conversion condition associated with the conversion word stored in the conversion word storage portion, in the conversion unit information, into the conversion word associated with the conversion condition; and
   a pattern comparing unit that compares the comparison command pattern information with the first command pattern information.

8. The computer readable medium according to claim 7,
wherein the conversion condition is a combination of a clue character string, which is information specifying a character string that is to be retrieved, and information indicating the position of a character string that is to be converted, relative to the clue character string, and
the command pattern constructing unit constructs the comparison command pattern information, by retrieving a character string that matches the clue character string, in the conversion unit information, and converting a character string whose position relative to the character string that matches the clue character string is indicated by the information indicating the position of a character string that is to be converted, into the conversion word associated with the conversion condition containing the clue character string.

9. The computer readable medium according to claim 2, further comprising:
   an association pattern accumulating portion that accumulates information establishing association with the first command pattern information that matches the conversion unit information, at a position corresponding to the position where the conversion unit information is located in the first source program.

10. The computer readable medium according to claim 2, further comprising:
    a program-based association pattern accumulating portion that accumulates information associating the first command pattern information that matches the conversion unit information of the first source program, and the first source program.

* * * * *